(12) United States Patent
Kurokawa

(10) Patent No.: US 12,319,805 B2
(45) Date of Patent: Jun. 3, 2025

(54) HOLLOW PARTICLES

(71) Applicant: ZEON CORPORATION, Tokyo (JP)

(72) Inventor: Hisashi Kurokawa, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 18/035,438

(22) PCT Filed: Nov. 11, 2021

(86) PCT No.: PCT/JP2021/041476
§ 371 (c)(1),
(2) Date: May 4, 2023

(87) PCT Pub. No.: WO2022/107674
PCT Pub. Date: May 27, 2022

(65) Prior Publication Data
US 2023/0407039 A1 Dec. 21, 2023

(30) Foreign Application Priority Data
Nov. 20, 2020 (JP) .................. 2020-193207

(51) Int. Cl.
*C08J 9/28* (2006.01)
*B01J 13/16* (2006.01)
(Continued)

(52) U.S. Cl.
CPC .............. *C08J 9/286* (2013.01); *B01J 13/16* (2013.01); *B01J 13/206* (2013.01); *C08F 20/20* (2013.01);
(Continued)

(58) Field of Classification Search
None
See application file for complete search history.

(56) References Cited

U.S. PATENT DOCUMENTS

| 2004/0091709 A1 | 5/2004 | Ohmura et al. |
| 2022/0033628 A1 | 2/2022 | Hirata et al. |

(Continued)

FOREIGN PATENT DOCUMENTS

| JP | 2000-313818 A | 11/2000 |
| JP | 2017-165890 A | 9/2017 |

(Continued)

OTHER PUBLICATIONS

English translation of Hirata et al. (WO 2020/066704) (Year: 2020).*

(Continued)

*Primary Examiner* — Ronak C Patel
(74) *Attorney, Agent, or Firm* — WHDA, LLP

(57) ABSTRACT

To provide hollow particles excellent in performance stability in a high-humidity environment and low in relative permittivity. Hollow particles which comprise a shell containing a resin and a hollow portion surrounded by the shell, wherein the shell contains, as the resin, a polymer in which from 70 parts by mass to 100 parts by mass of a crosslinkable monomer unit is contained in 100 parts by mass of all monomer units; wherein a void ratio is 60% or more; wherein a content of a surfactant present on a surface of the hollow particles is 200 ppm or less; and wherein a relative permittivity at a frequency of 1 MHz is 1.6 or less.

9 Claims, 2 Drawing Sheets

(51) Int. Cl.
   *B01J 13/20*     (2006.01)
   *C08F 20/20*     (2006.01)

(52) U.S. Cl.
   CPC .... *C08J 2201/0502* (2013.01); *C08J 2335/02* (2013.01)

(56) References Cited

U.S. PATENT DOCUMENTS

| | | |
|---|---|---|
| 2022/0033652 A1 | 2/2022 | Hirata et al. |
| 2022/0153881 A1 | 5/2022 | Iga et al. |

FOREIGN PATENT DOCUMENTS

| | | |
|---|---|---|
| JP | 2020-033503 A | 3/2020 |
| WO | 2002/072671 A2 | 9/2002 |
| WO | 2020/066704 A1 | 4/2020 |
| WO | 2020/066705 A1 | 4/2020 |
| WO | 2020/162300 A1 | 8/2020 |

OTHER PUBLICATIONS

English translation of Awazu et al. (JP 2017/165890). (Year: 2017).*
International Search Report dated Jan. 25, 2022, issued in counterpart to PCT/JP2021/041476. (3 pages).
Notification of Transmittal of Translation of the International Preliminary Report on Patentability (Form PCT/IB/338) issued in counterpart International Application No. PCT/JP2021/041476 mailed Jun. 1, 2023 with Forms PCT/ IB/373 and PCT/ISA/237. (7 pages).
Extended Supplementary European Search Report dated Nov. 19, 2024, issued in counterpart Application No. 21894548.3. (8 pages).

* cited by examiner

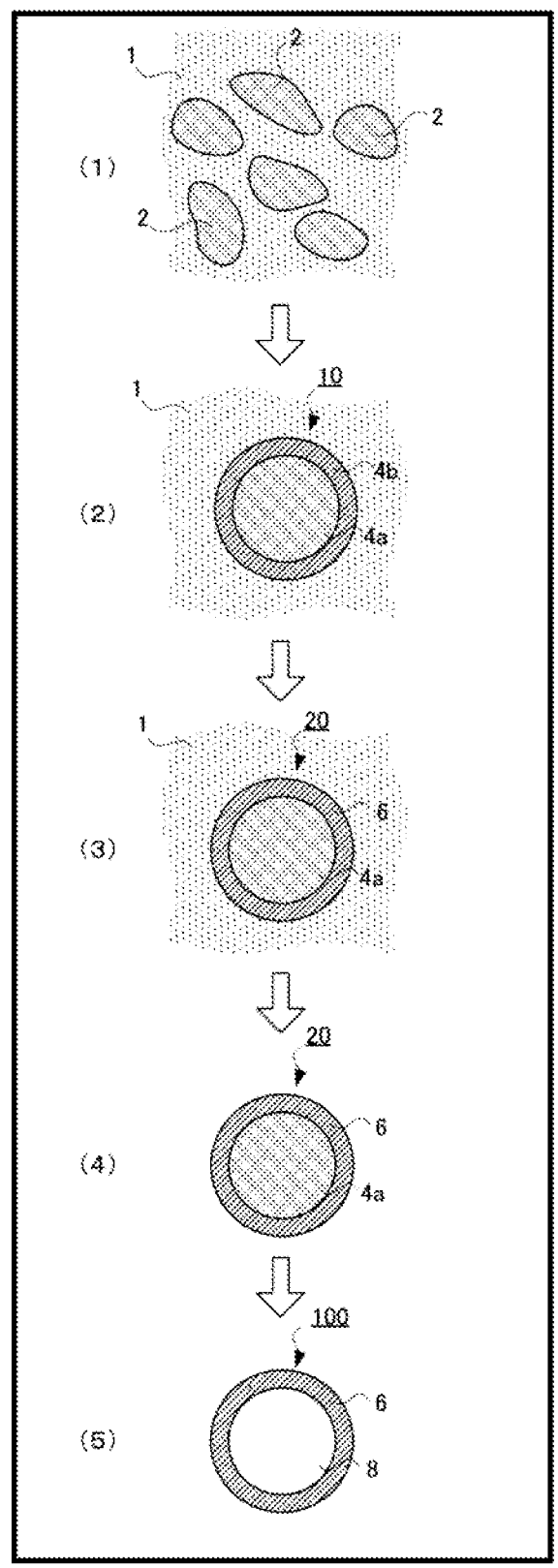

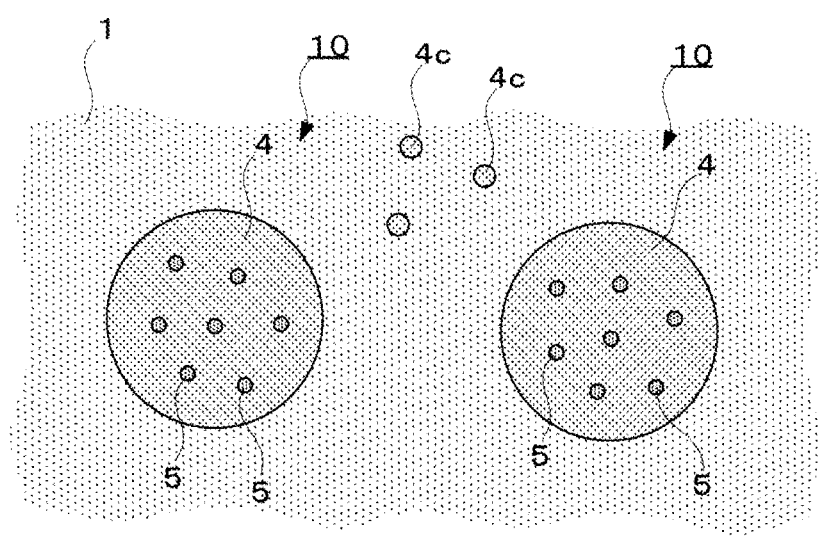

HOLLOW PARTICLES

TECHNICAL FIELD

The present disclosure relates to hollow particles.

BACKGROUND ART

Hollow particles (hollow resin particles) are particles each of which has a hollow in its interior, and they can scatter light well and can reduce light transmissivity as compared to solid particles in which their interiors are practically filled with resin; hence, hollow particles are widely used in the applications of, for example, aqueous coating materials and paper coating compositions, as organic pigments and masking agents excellent in optical properties such as opacity and whiteness. Also, in recent years, hollow particles are used as weight reducing materials, heat insulation materials or the like for resins and coating materials, which are used in various kinds of fields such as the automotive field, the electronic field, the electric field and the architecture field.

As an electronic material application, for example, on an electronic circuit board, hollow particles may be contained in an insulation resin layer for the purpose of suppressing the occurrence of crosstalk and an increase in transmission loss. On the electronic circuit board, crosstalk and transmission loss can be suppressed by decreasing the relative permittivity and dielectric dissipation factor of the insulation resin layer. Since the interior of the hollow particles is hollow, it has been attempted to decrease the permittivity and dielectric dissipation factor of the insulation resin layer by adding the hollow particles.

For example, Patent Literature 1 discloses hollow crosslinked resin particles used in an organic insulation material having low permittivity, which are particles obtained by polymerizing 1 to 100% by weight of a crosslinkable monomer and 0 to 99% by weight of a non-crosslinkable monomer (the total of the crosslinkable monomer and the non-crosslinkable monomer is 100% by weight), which have an average particle size of 0.03 μm to 10 μm, and which have an average concentration of metal ions of 50 ppm or lower. The hollow crosslinked resin particles of Patent Literature 1 are produced by dispersing a monomer in water with an emulsifier (a surfactant) and performing seed polymerization.

CITATION LIST

Patent Literature

Patent Literature 1: Japanese Patent Application Laid-Open (JP-A) No. 2000-313818

SUMMARY OF INVENTION

Technical Problem

An electronic circuit board is also required to have performance stability in a high-humidity environment. For example, it is required not to cause a failure such as migration in a high-humidity environment. However, an electronic circuit board containing the hollow crosslinked resin particles described in Patent Literature 1 may cause migration in a high-humidity environment. Also, the relative permittivity of the hollow crosslinked resin particles described in Patent Literature 1 is not sufficiently low, and a further decrease in the relative permittivity is required.

An object of the present disclosure is to provide hollow particles which are excellent in performance stability in a high-humidity environment and low in relative permittivity.

Solution to Problem

The inventor of the present disclosure found that a surfactant remaining on the surface of hollow particles contained in an electronic circuit board, contributes to the occurrence of migration on the electronic circuit board in a high-humidity environment.

The present disclosure provides hollow particles which comprise a shell containing a resin and a hollow portion surrounded by the shell,
wherein the shell contains, as the resin, a polymer in which from 70 parts by mass to 100 parts by mass of a crosslinkable monomer unit is contained in 100 parts by mass of all monomer units;
wherein a void ratio is 60% or more;
wherein a content of a surfactant present on a surface of the hollow particles is 200 ppm or less; and
wherein a relative permittivity at a frequency of 1 MHz is 1.6 or less.

In the hollow particles of the present disclosure, a volume average particle diameter is preferably from 1 μm to 10 μm.

In the hollow particles of the present disclosure, the void ratio is preferably 90% or less.

In the hollow particles of the present disclosure, a content of a metal is preferably 100 ppm or less.

Advantageous Effects of Invention

According to the present disclosure as described above, hollow particles which are excellent in performance stability in a high-humidity environment and low in relative permittivity, can be provided.

BRIEF DESCRIPTION OF DRAWINGS

In the accompanying drawings,

FIG. 1 is a diagram illustrating an example of the method for producing the hollow particles of the present disclosure, and FIG. 2 is a schematic diagram showing an embodiment of a suspension in a suspension step.

DESCRIPTION OF EMBODIMENTS

In the present disclosure, "A to B" in a numerical range is used to describe a range in which the numerical value A is included as the lower limit value and the numerical value B is included as the upper limit value.

Also in the present disclosure, (meth)acrylate means each of acrylate and methacrylate; (meth)acryl means each of acryl and methacryl; and (meth)acryloyl means each of acryloyl and methacryloyl.

Also in the present disclosure, the term "polymerizable monomer" means a compound having an addition-polymerizable functional group (in the present disclosure, it may be simply referred to as a "polymerizable functional group"). Also in the present disclosure, as the polymerizable monomer, a compound having an ethylenically unsaturated bond as the addition-polymerizable functional group, is generally used.

There are two kinds of polymerizable monomers: a non-crosslinkable monomer and a crosslinkable monomer. The non-crosslinkable monomer is a polymerizable monomer which has only one polymerizable functional group, and the crosslinkable monomer is a polymerizable monomer which has two or more polymerizable functional groups and which forms crosslinking in resin by a polymerization reaction.

The hollow particles of the present disclosure are hollow particles which comprise a shell containing a resin and a hollow portion surrounded by the shell, wherein the shell contains, as the resin, a polymer in which from 70 parts by mass to 100 parts by mass of a crosslinkable monomer unit is contained in 100 parts by mass of all monomer units;

wherein a void ratio is 60% or more;

wherein a content of a surfactant present on a surface of the hollow particles is 200 ppm or less; and wherein a relative permittivity at a frequency of 1 MHz is 1.6 or less.

The hollow particles of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that is clearly distinguishable from many minute spaces uniformly dispersed in the porous structure.

The hollow portion of the hollow particles can be determined by, for example, SEM observation of a cross section of the particles or TEM observation of the particles as they are.

From the viewpoint of obtaining low permittivity, the hollow portion of the hollow particles of the present disclosure is preferably filled with gas such as air or nitrogen, or it is preferably in a reduced pressure state close to vacuum.

Hollow particles have a hollow portion in the interior of the particles. Accordingly, they are expected to impart performances such as weight reduction, thermal insulation and low permittivity to a material containing the hollow particles. However, when the content of the surfactant present on the surface of the hollow particles is large, the surfactant on the particle surface may absorb water in a high-humidity environment, and the hollow particles may impart undesired performances. For example, when the surface of the hollow particles contained in the insulation resin layer of an electronic circuit board contains a large amount of surfactant, the surfactant on the particle surface absorbs water in a high-humidity environment, and migration is likely to occur, accordingly. In the case of the hollow particles of the present disclosure, the content of the surfactant present on the particle surface is sufficiently decreased. Accordingly, the hollow particles do not impart undesired performances even in a high-humidity environment, and they are excellent in performance stability.

In the present disclosure, the surfactant is a compound having a hydrophilic group and a hydrophobic group per molecule, and it encompasses a compound that is generally used as a surfactant. In general, the surfactant has such a water solubility, that the solubility in water at 25° C. is 1 g/L or more.

Furthermore, the void ratio of the hollow particles of the present disclosure is 60% or more, and the polymer contained in the shell is the polymer in which from 70 parts by mass to 100 parts by mass of the crosslinkable monomer unit is contained in 100 parts by mass of all monomer units. Accordingly, the hollow particles of the present disclosure can achieve low permittivity. As the space in the interior of the hollow particles increases, the relative permittivity tends to decrease. Since the void ratio is 60% or more and high, the hollow particles of the present disclosure can achieve low permittivity. When the space in the interior of the hollow portion is decreased by the deformation or collapse of the hollow particles, the relative permittivity of the hollow particles tends to increase. On the other hand, the hollow particles of the present disclosure are excellent in strength and less likely to deform since the content of the crosslinkable monomer unit in the shell of the hollow particles is large, and a covalent bond network is tightly strung in the shell. Accordingly, the shape of the hollow portion is easily maintained, and the hollow particles of the present disclosure can maintain low permittivity.

Hereinafter, an example of the method for producing the hollow particles according to the present disclosure, will be described. Then, the hollow particles of the present disclosure will be described in detail.

1. Method for Producing Hollow Particles

The hollow particles of the present invention can be obtained by, for example, a method for producing hollow particles, comprising:

preparing a mixture liquid containing a polymerizable monomer, a hydrophobic solvent, a polymerization initiator, a dispersion stabilizer and an aqueous medium, suspending the mixture liquid to prepare a suspension in which droplets of a monomer composition containing the polymerizable monomer, the hydrophobic solvent and the polymerization initiator are dispersed in the aqueous medium, and subjecting the suspension to a polymerization reaction to prepare a precursor composition containing precursor particles which have a hollow portion surrounded by a shell containing a resin and which include the hydrophobic solvent in the hollow portion.

The above-described method for producing the hollow particles includes the steps of preparing the mixture liquid, preparing the suspension, and subjecting the suspension to the polymerization reaction. The method may further include other steps. As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the above-described method for producing the hollow particles may be a production method including the following steps.

(1) Mixture Liquid Preparation Step

The mixture liquid preparation step includes preparing the mixture liquid containing the polymerizable monomer, the hydrophobic solvent, the polymerization initiator, the dispersion stabilizer and the aqueous medium.

(2) Suspension Step

The suspension step includes suspending the mixture liquid to prepare the suspension in which the droplets of the monomer composition containing the polymerizable monomer, the hydrophobic solvent and the polymerization initiator are dispersed in the aqueous medium.

(3) Polymerization Step

The polymerization step includes subjecting the suspension to a polymerization reaction to prepare the precursor composition containing the precursor particles which have the hollow portion surrounded by the shell containing the resin and which include the hydrophobic solvent in the hollow portion.

(4) Washing and Solid-Liquid Separation Step

The washing and solid-liquid separation step includes carrying out washing for removal of the dispersion stabilizer remaining in the precursor composition and then performing solid-liquid separation of the precursor composition to obtain the precursor particles including the hydrophobic solvent in the hollow portion.

(5) Solvent Removal Step

The solvent removal step includes removing the hydrophobic solvent from the precursor particles obtained by the solid-liquid separation step to obtain the hollow particles.

In the present disclosure, the hollow particles having the hollow portion filled with the hydrophobic solvent, may be considered as the intermediate of the hollow particles in which the hollow portion is filled with gas, and they may be referred to as the "precursor particles". Also in the present disclosure, the "precursor composition" means a composition containing the precursor particles.

FIG. 1 is a schematic diagram showing an example of the method for producing the hollow particles according to the present disclosure. The diagrams (1) to (5) in FIG. 1 correspond to the steps (1) to (5) described above, respectively. White arrows between the diagrams indicate the order of the steps. FIG. 1 is merely a schematic diagram for description, and the above-described production method is not limited to the method shown in FIG. 1. Further, the structures, dimensions and shapes of materials used for the production method of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the polymerizable monomer, the hydrophobic solvent and the polymerization initiator.

The diagram (2) of FIG. 1 is a schematic cross-sectional view showing an embodiment of the suspension in the suspension step. The suspension contains the aqueous medium 1 and a droplet 10 of the monomer composition dispersed in the aqueous medium 1. The droplet 10 of the monomer composition contains the polymerizable monomer, the hydrophobic solvent and the polymerization initiator, and their distribution in the droplet is not uniform. The droplet 10 of the monomer composition has the following structure: phase separation occurs between a hydrophobic solvent 4a and a material 4b containing the polymerizable monomer and not containing the hydrophobic solvent; the hydrophobic solvent 4a is distributed in the center; the material 4b not containing the hydrophobic solvent is distributed on the surface side; and the dispersion stabilizer (not shown) is on the surface.

The diagram (3) of FIG. 1 is a schematic cross-sectional view showing an embodiment of the precursor composition containing the precursor particles which have the hollow portion surrounded by the shell containing the resin and which include the hydrophobic solvent in the hollow portion. The precursor composition contains the aqueous medium 1 and the precursor particle (a precursor particle 20) which includes the hydrophobic solvent 4a in the hollow portion. A shell 6 forming the outer surface of the precursor particle 20 is formed by polymerization of the polymerizable monomer in the droplet 10 of the monomer composition, and the shell 6 contains the polymer of the polymerizable monomer as the resin.

The diagram (4) of FIG. 1 is a schematic cross-sectional view showing an embodiment of the precursor particle after the solid-liquid separation step. The diagram (4) of FIG. 1 shows a state where the aqueous medium 1 has been removed from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrophobic solvent 4a has been removed from the state shown in the diagram (4) of FIG. 1. By the removal of the hydrophobic solvent from the precursor particle, a hollow particle 100 having a gas-filled hollow portion 8 in the interior of the shell 6, is obtained.

Hereinbelow, the five steps described above and other steps are described in order.

(1) Mixture Liquid Preparation Step

The mixture liquid preparation step includes preparing the mixture liquid containing the polymerizable monomer, the hydrophobic solvent, the polymerization initiator, the dispersion stabilizer and the aqueous medium. The mixture liquid may further contain other materials to the extent that does not impair the effects of the present disclosure.

The materials for the mixture liquid will be described in the order of (A) the polymerizable monomer, (B) the hydrophobic solvent, (C) the polymerization initiator, (D) the dispersion stabilizer, (E) the aqueous medium and (F) other materials.

(A) Polymerizable Monomer

In the production method described above, the polymerizable monomer of the mixture liquid contains at least the crosslinkable monomer. It may further contain the non-crosslinkable monomer to the extent that does not impair the effects of the present disclosure.

From the point of view that the polymerization reaction is easily stabilized and hollow particles with high strength and heat resistance are obtained, a (meth)acrylic polymerizable monomer containing a (meth)acryloyl group as a polymerizable functional group, is preferably used as the polymerizable monomer.

Meanwhile, from the viewpoint of decreasing the relative permittivity and dielectric dissipation factor of the hollow particles, a hydrocarbon monomer composed of carbon and hydrogen can be preferably used.

[Crosslinkable Monomer]

Since the crosslinkable monomer has a plurality of ethylenically unsaturated double bonds, monomers can be linked together, and the crosslinking density of the shell can be increased.

As the crosslinkable monomer, examples include, but are not limited to, a bifunctional crosslinkable monomer having two polymerizable functional groups, such as divinylbenzene, divinylbiphenyl, divinylnaphthalene, diallyl phthalate, allyl (meth)acrylate, ethylene glycol di(meth)acrylate, diethylene glycol di(meth)acrylate and pentaerythritol di(meth)acrylate, and trifunctional or higher-functional crosslinkable monomers having three or more polymerizable functional groups, such as trimethylolpropane tri(meth)acrylate, ditrimethylolpropane tetra(meth)acrylate, pentaerythritol tri(meth)acrylate, pentaerythritol tetra(meth)acrylate, dipentaerythritol hexa(meth)acrylate, dipentaerythritol poly(meth)acrylate, and ethoxylates thereof. These crosslinkable monomers may be used alone or in combination of two or more.

As the bifunctional crosslinkable monomer, divinylbenzene, ethylene glycol di(meth)acrylate and pentaerythritol di(meth)acrylate are preferred from the following viewpoints: the polymerization reaction is easily stabilized; hollow particles with high strength and high heat resistance are obtained; and the relative permittivity of the hollow particles is decreased. Of them, ethylene glycol di(meth)acrylate and pentaerythritol di(meth)acrylate are preferred from the viewpoint of increasing the strength and heat resistance of the hollow particles. From the viewpoint of further decreasing the relative permittivity and dielectric dissipation factor of the hollow particles, divinylbenzene, which is a hydrocarbon monomer, is preferred.

As the trifunctional or higher-functional crosslinkable monomer, pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate are preferred from the following viewpoints: the polymerization reaction is easily stabilized; hollow particles with high strength and high heat resistance are obtained; and the relative permittivity of the hollow particles is decreased. Of them, trimethylolpropane tri(meth)acrylate and pentaerythritol tetra(meth)acrylate are more preferred.

The content of the crosslinkable monomer is preferably from 70 parts by mass to 100 parts by mass, with respect to the total mass (100 parts by mass) of the polymerizable monomer in the mixture liquid. When the content of the crosslinkable monomer is 70 parts by mass or more, the content of the crosslinkable monomer unit in the shell of the hollow particles is large enough. Accordingly, a covalent bond network is tightly strung in the shell. As a result, the shell thus formed is excellent in strength, is less likely to collapse, and is less likely to deform even when heat or the like is applied from the outside. In addition, when the content of the crosslinkable monomer is 70 parts by mass or more, the strength of the hollow particles is increased. Accordingly, an increase in the relative permittivity due to a collapse or deformation of the hollow particles can be suppressed. The content of the crosslinkable monomer is preferably 80 parts by mass or more, and more preferably 90 parts by mass or more.

The polymerizable monomer in the mixture liquid preferably contains at least a bifunctional crosslinkable monomer as the crosslinkable monomer. Accordingly, the hollow portion is easily formed in the interior of the particles. The polymerizable monomer preferably contains the bifunctional crosslinkable monomer in combination with the trifunctional or higher-functional crosslinkable monomer, from the point of view that the hollow portion is easily formed in the interior of the particles and the shell strength is further increased.

The content of the bifunctional crosslinkable monomer in 100 parts by mass of the polymerizable monomer in the mixture liquid, is preferably 50 parts by mass or more, and more preferably 60 parts by mass or more. When the polymerizable monomer contains the trifunctional or higher-functional crosslinkable monomer as the crosslinkable monomer, the upper limit of the content of the bifunctional crosslinkable monomer in 100 parts by mass of the polymerizable monomer in the mixture liquid, is preferably 95 parts by mass or less, more preferably 90 parts by mass or less, and still more preferably 80 parts by mass or less.

When the polymerizable monomer in the mixture liquid contains the trifunctional or higher-functional crosslinkable monomer as the crosslinkable monomer, the content of the trifunctional or higher-functional crosslinkable monomer in 100 parts by mass of the polymerizable monomer in the mixture liquid, is not particularly limited. The lower limit is preferably 5 parts by mass or more, more preferably 10 parts by mass or more, and still more preferably 20 parts by mass or more. The upper limit is preferably 50 parts by mass or less, and more preferably 40 parts by mass or less.

[Non-Crosslinkable Monomer]

The polymerizable monomer in the mixture liquid may further contain a non-crosslinkable monomer to the extent that does not impair the effects of the present disclosure.

As the non-crosslinkable monomer, a monovinyl monomer is preferably used. The monovinyl monomer is a compound having one polymerizable vinyl functional group. As the monovinyl monomer, examples include, but are not limited to, the following: a (meth)acrylic monovinyl monomer such as methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate and (meth)acrylic acid; an aromatic vinyl monomer such as styrene, vinyltoluene, α-methylstyrene, p-methylstyrene, ethylvinylbenzene, ethylvinylbiphenyl, ethylvinylnaphthalene and halogenated styrene; a monoolefin monomer such as ethylene, propylene and butylene; a (meth)acrylamide monomer such as (meth)acrylamide, N-methylol (meth)acrylamide and N-butoxymethyl (meth)acrylamide and derivatives thereof; a diene monomer such as butadiene and isoprene; a carboxylic acid vinyl ester monomer such as vinyl acetate; a vinyl halide monomer such as vinyl chloride; a vinylidene halide monomer such as vinylidene chloride; and vinylpyridine. These non-crosslinkable monomers may be used alone or in combination of two or more.

Of them, from the viewpoint of reactivity and heat resistance, the (meth)acrylic monovinyl monomer is preferred, and at least one selected from butyl acrylate and methyl methacrylate is more preferred. From the viewpoint of decreasing the relative permittivity and dielectric dissipation factor of the hollow particles, a hydrocarbon monomer such as styrene, vinyl toluene, α-methylstyrene, p-methylstyrene, ethylvinylbenzene, ethylvinylbiphenyl and ethylvinylnaphthalene is preferred.

With respect to 100 parts by mass of the polymerizable monomer in the mixture liquid, the content of the non-crosslinkable monomer is preferably 30 parts by mass or less, more preferably 20 parts by mass or less, still more preferably 10 parts by mass or less, and even more preferably 5 parts by mass or less.

With respect to the total (100 parts by mass) of the polymerizable monomer and the hydrophobic solvent in the mixture liquid, the content of the polymerizable monomer is preferably from 15 parts by mass to 50 parts by mass, more preferably from 20 parts by mass to 40 parts by mass, and still more preferably from 20 parts by mass to 30 parts by mass. When the content of the polymerizable monomer is within the range, the balance of the void ratio, particle diameter and mechanical strength of the hollow particles becomes excellent.

From the viewpoint of increasing the mechanical strength of the hollow particles, the content of the polymerizable monomer is preferably 90% by mass or more, and more preferably 95% by mass or more, with respect to the total mass (100% by mass) of a solid component obtained by excluding the hydrophobic solvent from the material for the oil phase in the mixture liquid.

In the present disclosure, the solid component includes all components excluding a solvent, and a liquid polymerizable monomer and the like are included in the solid component.

(B) Hydrophobic Solvent

The hydrophobic solvent used in the above-described production method is a non-polymerizable, sparingly water-soluble organic solvent.

The hydrophobic solvent serves as a spacer material for forming the hollow portion in the interior of particles. In the suspension step described later, the suspension in which the droplets of the monomer composition containing the hydrophobic solvent are dispersed in the aqueous medium, is obtained. In the suspension step, phase separation occurs in the droplets of the monomer composition. As a result, the hydrophobic solvent with low polarity is likely to collect in the interior of the droplets of the monomer composition. In the end, according to their respective polarities, the hydrophobic solvent is distributed in the interior of the droplets of the monomer composition, and the material not containing the hydrophobic solvent is distributed at the periphery of the droplets of the monomer composition.

Then, in the polymerization step described later, an aqueous dispersion containing the hollow particles including the hydrophobic solvent, is obtained. That is, since the hydrophobic solvent collects in the interior of the particles, the hollow portion filled with the hydrophobic solvent is formed in the interior of the obtained precursor particles.

In the above-described production method, the hydrophobic solvent is appropriately selected depending on the type of the polymerizable monomer, and it is not particularly limited. As the hydrophobic solvent, a conventionally-known hydrophobic solvent may be used. As the hydrophobic solvent, examples include, but are not limited to, esters such as ethyl acetate and butyl acetate; ether esters such as propylene glycol monomethyl ether acetate and propylene glycol monoethyl ether acetate; aromatic hydrocarbons such as benzene, toluene and xylene; and aliphatic hydrocarbons such as hexane, methylhexane, cyclohexane and methylcy-clohexane. These hydrophobic solvents may be used alone or in combination of two or more.

The hydrophobic solvent is preferably selected so that the HSP distance between the crosslinkable monomer and the hydrophobic solvent in the polymerizable monomer is 5.80 or more and 6.50 or less. The HSP distance is more preferably 5.85 or more and 6.40 or less, and it is still more preferably 5.90 or more and 6.30 or less. When the HSP distance between the crosslinkable monomer and the hydrophobic solvent is within the above range, sufficient phase separation occurs between the polymerizable monomer and the hydrophobic solvent in the droplets of the monomer composition, and the hollow portion is easily formed in the interior of the particles. Also, the thickness of the shell formed by the polymerization reaction easily becomes uniform.

The HSP distance is an index representing solubility between substances by using Hansen solubility parameters (HSP). As the HSP distance comes close to 0, the compatibility between substances is determined to be high. HSP represents the vector of a three-dimensional space (Hansen space) using the following parameters as the coordinate axes: dispersion term (dD), polarity term (dP) and hydrogen bonding term (dH). The three parameters dD, dP and dH represent values specific to substances. The software developed by Hansen et al. (software name: Hansen Solubility Parameter in Practice (HSPiP)) includes the databases on the dD, dP and dH of various substances. By using HSPiP, HSP can be calculated based on the chemical structures of substances.

To obtain the HSP of a mixture of several substances, based on the dD, dP and dH values of the substances contained in the mixture and on the ratio of the substances, the weighted averages thereof are calculated to obtain the dispersion term (dD), polarity term (dP) and hydrogen bonding term (dH) of the mixture, and the HSP of the mixture are obtained.

The HSP distance is a vector distance given by the HSP of two substances, and it is calculated by the following formula (A) using the values of the three parameters of the first substance (dispersion term $dD_1$, polarity term $dP_1$ and hydrogen bonding term $dH_1$) and the values of the three parameters of the second substance (dispersion term $dD_2$, polarity term $dP_2$ and hydrogen bonding term $dH_2$).

$$\text{HSP distance} = \{4(dD_1-dD_2)^2+(dP_1-dP_2)^2+(dH_1-dH_2)^2\}^{0.5} \quad \text{Formula (A)}$$

In the present disclosure, the HSP distance is a value calculated by HSPiP (version 5.3.03). In the HSPiP, each of the dD, dP and dH values is expressed as significant digits with one decimal place, and the HSP distance is expressed as significant digits with two decimal places.

The boiling point of the hydrophobic solvent is not particularly limited. From the viewpoint of ease of removal in the solvent removal step described later, the boiling point of the hydrophobic solvent is preferably 130° C. or less, and more preferably 100° C. or less. On the other hand, the boiling point of the hydrophobic solvent is preferably 50° C. or more, and more preferably 60° C. or more, from the point of view that the hydrophobic solvent can be easily included in the precursor particles.

When the hydrophobic solvent is a mixed solvent containing several kinds of hydrophobic solvents and it has several boiling points, the boiling point of the solvent having the highest boiling point among the solvents contained in the mixed solvent, is preferably equal to or less than the upper limit value, and the boiling point of the solvent having the lowest boiling point among the solvents contained in the mixed solvent, is preferably equal to or more than the lower limit value.

The relative permittivity at 20° C. of the hydrophobic solvent used in the above-described production method, is preferably 3 or less. The relative permittivity is one of the indices of the level of the polarity of a compound. In the case where the relative permittivity of the hydrophobic solvent is 3 or less and sufficiently small, it is considered that phase separation progresses rapidly in the droplets of the polymerizable monomer and a hollow is easily formed.

Examples of hydrophobic solvents having a relative permittivity at 20° C. of 3 or less, are as follows. The inside of the parentheses is the value of relative permittivity.

Pentane (1.8), hexane (1.9), heptane (1.9), octane (1.9), cyclohexane (2.0), benzene (2.3) and toluene (2.4)

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

The void ratio of the hollow particles can be controlled by changing the amount of the hydrophobic solvent in the mixture liquid. In the suspension step described later, the polymerization reaction progresses while oil droplets containing the polymerizable monomer and so on include the hydrophobic solvent. Accordingly, as the content of the hydrophobic solvent increases, the void ratio of the obtained hollow particles tends to increase.

In the present disclosure, with respect to 100 parts by mass of the polymerizable monomer, the content of the hydrophobic solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the residual hydrophobic solvent in the hollow particles is easily reduced. With respect to 100 parts by mass of the polymerizable monomer, the content of the hydrophobic solvent in the mixture liquid is more preferably 60 parts by mass or more and 400 parts by mass or less, and still more preferably 70 parts by mass or more and 300 parts by mass or less.

(C) Polymerization Initiator

In the above-described production method, the mixture liquid preferably contains an oil-soluble polymerization initiator as the polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water at 25° C. of 2 g/L or less. As the oil-soluble polymerization initiator, examples include, but are not limited to, benzoyl peroxide, lauroyl peroxide, t-butyl peroxide 2-ethylhexanoate, 2,2'-azobis(2,4-dimethylvaleronitrile), azobis(isobutyronitrile) and 2,2'-azobis(4-methoxy-2,4-dimethylvaleronitrile).

With respect to 100 parts by mass of the polymerizable monomer in the mixture liquid, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of the oil-soluble polymerization initiator is within the above range, a polymerization reaction can progress sufficiently; the oil-soluble polymerization initiator is less likely to remain after the end of the polymerization reaction; and an unexpected side reaction is less likely to progress.

From the viewpoint of decreasing the content of the metal in the shell, the polymerization initiator is preferably a metal-free polymerization initiator.

(D) Dispersion Stabilizer

The dispersion stabilizer is an agent for dispersing the droplets of the monomer composition in the aqueous medium in the suspension step. In the present disclosure, from the viewpoint of controlling the content of the surfactant present on the surface of the hollow particles to 200 ppm or less, it is preferable that a surfactant is not used as the dispersion stabilizer. In the present disclosure, an inorganic dispersion stabilizer is preferably used as the dispersion stabilizer. By using the inorganic dispersion stabilizer, the particle diameter of the droplets can be easily controlled in the suspension; the particle size distribution of the obtained hollow particles can be sharp; and an excessive decrease in the shell thickness can be suppressed, and a decrease in the strength of the hollow particles can be suppressed. The inorganic dispersion stabilizer can exert such effects especially when the inorganic dispersion stabilizer is used in combination with the particle diameter control agent described later.

As the inorganic dispersion stabilizer, examples include, but are not limited to, inorganic compounds including a sulfate such as barium sulfate and calcium sulfate; a carbonate such as barium carbonate, calcium carbonate and magnesium carbonate; a phosphate such as calcium phosphate; a metal oxide such as aluminum oxide and titanium oxide; and a metal hydroxide such as aluminum hydroxide, magnesium hydroxide, calcium hydroxide, barium hydroxide and iron(II)hydroxide. These inorganic dispersion stabilizers may be used alone or in combination of two or more. Of these inorganic dispersion stabilizers, a sparingly water-soluble metal salt such as the above-mentioned sulfate, carbonate, phosphate and metal hydroxide is preferred; a metal hydroxide is more preferred; and a magnesium hydroxide is particularly preferred.

In the present disclosure, the sparingly water-soluble metal salt is preferably an inorganic metal salt such that the solubility in water at 25° C. is 5 g/L or less.

In the present disclosure, the sparingly water-soluble inorganic dispersion stabilizer is particularly preferably used in the form of colloidal particles being dispersed in the aqueous medium, that is, in the form of a colloidal dispersion containing the sparingly water-soluble, inorganic dispersion stabilizer colloidal particles. By using the sparingly water-soluble inorganic dispersion stabilizer in the form of the colloidal dispersion containing the sparingly water-soluble inorganic dispersion stabilizer colloidal particles, the particle size distribution of the droplets of the monomer composition can be sharp; moreover, the amount of the inorganic dispersion stabilizer remaining in the obtained hollow particles can be easily reduced by washing.

The colloidal dispersion containing the sparingly water-soluble inorganic dispersion stabilizer colloidal particles can be prepared by, for example, reacting at least one selected from alkali metal hydroxide salts and alkaline earth metal hydroxide salts with a water-soluble polyvalent metal salt, which is not an alkaline earth metal hydroxide salt, in the aqueous medium.

As the alkali metal hydroxide salts, examples include, but are not limited to, lithium hydroxide, sodium hydroxide and potassium hydroxide. As the alkaline earth metal hydroxide salts, examples include, but are not limited to, barium hydroxide and calcium hydroxide.

The water-soluble polyvalent metal salt may be a water-soluble polyvalent metal salt other than compounds corresponding to the above-mentioned alkaline earth metal hydroxide salts. As the polyvalent metal salt, examples include, but are not limited to, magnesium metal salts such as magnesium chloride, magnesium phosphate and magnesium sulfate; calcium metal salts such as calcium chloride, calcium nitrate, calcium acetate and calcium sulfate; aluminum metal salts such as aluminum chloride and aluminum sulfate; barium salts such as barium chloride, barium nitrate and barium acetate; and zinc salts such as zinc chloride, zinc nitrate and zinc acetate. Among them, magnesium metal salts, calcium metal salts and aluminum metal salts are preferred; magnesium metal salts are more preferred; and magnesium chloride is particularly preferred. The water-soluble polyvalent metal salts may be used alone or in combination of two or more.

The method for reacting the water-soluble polyvalent metal salt with the at least one selected from alkali metal hydroxide salts and alkaline earth metal hydroxide salts in the aqueous medium, is not particularly limited. As the method, examples include, but are not limited to, mixing an aqueous solution of the water-soluble polyvalent metal salt and an aqueous solution of the at least one selected from alkali metal hydroxide salts and alkaline earth metal hydroxide salts. In this method, from the point of view that the particle diameter of the sparingly water-soluble metal hydroxide colloidal particles can be suitably controlled, it is preferable to mix the aqueous solutions by, while stirring the aqueous solution of the water-soluble polyvalent metal salt, gradually adding the aqueous solution of the at least one selected from alkali metal hydroxide salts and alkaline earth metal hydroxide salts to the aqueous solution of the water-soluble polyvalent metal salt.

From the viewpoint of obtaining the hollow particles having a volume average particle diameter of 1 µm or more and 10 µm or less, it is preferable to use a colloidal dispersion obtained by reacting the water-soluble polyvalent metal salt with the at least one selected from alkali metal hydroxide salts and alkaline earth metal hydroxide salts at a temperature of 20° C. or more and 50° C. or less in the aqueous medium.

The content of the dispersion stabilizer is not particularly limited. With respect to the total mass (100 parts by mass) of the polymerizable monomer and the hydrophobic solvent, the content of the dispersion stabilizer is preferably from 0.5 parts by mass to 10 parts by mass, and more preferably from 1.0 part by mass to 8.0 parts by mass. When the content of the dispersion stabilizer is equal to or more than the lower limit value, the droplets of the monomer composition can be sufficiently dispersed in the suspension so that they do not join together. On the other hand, when the content of the dispersion stabilizer is equal to or less than the upper limit value, an increase in the viscosity of the suspension is prevented in the formation of the droplets, and a problem such that a droplet forming machine is clogged with the suspension, can be avoided.

With respect to 100 parts by mass of the aqueous medium, the content of the dispersion stabilizer is generally 2 parts by mass or more and 15 parts by mass or less, and preferably 3 parts by mass or more and 8 parts by mass or less.

The content of the dispersion stabilizer is preferably in the above range, from the viewpoint of controlling the volume average particle diameter of the hollow particles to 1 µm to 10 µm.

(E) Aqueous Medium

In the present disclosure, the term "aqueous medium" means a medium selected from the group consisting of water, a hydrophilic solvent and a mixture thereof.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. From the viewpoint of decreasing the content of the metal in the shell, the water is preferably ion-exchanged water.

When a mixture of water and a hydrophilic solvent is used, from the viewpoint of forming the droplets of the monomer composition, it is important that the polarity of the entire mixture is not too low. In this case, for example, the mass ratio between water and the hydrophilic solvent (water hydrophilic solvent) may be set to 99:1 to 50:50.

(F) Other Materials

The mixture liquid may further contain other materials that are different from the above-mentioned materials (A) to (E), to the extent that does not impair the effects of the present disclosure.

As another material, the mixture liquid preferably contains a particle diameter control agent. When the mixture liquid contains the particle diameter control agent, the particle diameter of the droplets of the monomer composition and the thickness of the shell of the obtained hollow particles can be appropriately controlled.

As the particle diameter control agent, for example, a polar resin described later, or at least one selected from the group consisting of rosin acids, higher fatty acids and metal salts thereof, can be used. In the suspension step described later, the particle diameter control agent can appropriately control the particle diameter of the droplets of the monomer composition containing the polymerizable monomer and the hydrophobic solvent. In the suspension step, the droplets of the monomer composition are formed in the aqueous medium by the action of the dispersion stabilizer. In the droplets of the monomer composition, phase separation occurs between the hydrophobic solvent and the material containing the polymerizable monomer and not containing the hydrophobic solvent; the hydrophobic solvent is distributed in the center; and the material not containing the hydrophobic solvent is distributed on the surface side. When the mixture liquid contains the particle diameter control agent, the droplets are presumed to have the following structure: the particle diameter control agent is distributed in the vicinity of the surface of the droplets of the monomer composition, and the dispersion stabilizer is on the surface of the droplets. Such a material distribution structure is formed according to differences in affinity for the aqueous medium between the materials. When the mixture liquid contains the particle diameter control agent, the particle diameter of the droplets of the monomer composition can be appropriately controlled. This is thought to be because the droplets of the monomer composition in the suspension have the above-mentioned material distribution structure, an interaction between the dispersion stabilizer and the particle diameter control agent occurs on the surface of the droplets, and the dispersibility of the droplets by the dispersion stabilizer is changed.

In the present disclosure, the polar resin is a polymer containing a repeating unit which contains a heteroatom. As the polar resin, examples include, but are not limited to, an acrylic resin, a polyester resin, and a vinyl resin containing a heteroatom.

In general, the polar resin has a water solubility of less than 1 g/L. In the present disclosure, the polar resin is distinguished from the surfactant in that it is water-insoluble.

The polar resin may be a homopolymer or copolymer of a heteroatom-containing monomer, or it may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter of the hollow particles, in 100% by mass of all the repeating units constituting the copolymer, the amount of the heteroatom-containing monomer unit is preferably 50% by mass or more, more preferably 70% by mass or more, and still more preferably 90% by mass or more.

As the heteroatom-containing monomer for the polar resin, examples include, but are not limited to, a (meth)

acrylic monovinyl monomer which is a monomer containing a (meth)acryloyl group, such as methyl (meth)acrylate, ethyl (meth)acrylate, butyl (meth)acrylate, 2-ethylhexyl (meth) acrylate, lauryl (meth)acrylate, acrylic acid, methacrylic acid, 2-hydroxyethyl (meth)acrylate, 2-hydroxypropyl (meth)acrylate, 4-hydroxybutyl (meth)acrylate, methoxypolyethylene glycol (meth)acrylate, dimethylaminoethyl (meth)acrylate, diethylaminoethyl (meth)acrylate, glycidyl (meth)acrylate, and 4-hydroxybutyl acrylate glycidyl ether; an aromatic vinyl monomer containing a heteroatom, such as halogenated styrene and styrene sulfonate; a carboxylic acid vinyl ester monomer such as vinyl acetate; a vinyl halide monomer such as vinyl chloride; a vinylidene halide monomer such as vinylidene chloride; vinylpyridine; a carboxyl group-containing monomer such as an ethylenically unsaturated carboxylic acid monomer such as crotonic acid, cinnamic acid, itaconic acid, fumaric acid, maleic acid and butene tricarboxylic acid; and an epoxy group-containing monomer such as allyl glycidyl ether. These heteroatom-containing monomers may be used alone or in combination of two or more.

As the heteroatom-free monomer for the polar resin, examples include, but are not limited to, an aromatic vinyl monomer not containing a heteroatom, such as styrene, vinyltoluene, α-methylstyrene and p-methylstyrene; a monoolefin monomer such as ethylene, propylene and butylene; and a diene monomer such as butadiene and isoprene. These heteroatom-free monomers may be used alone or in combination of two or more.

From the viewpoint of high compatibility with the polymerizable monomer and easily controlling the particle diameter of the hollow particles, the polar resin is preferably an acrylic resin. In the acrylic resin, with respect to 100% by mass of all the repeating units constituting the resin, the total mass of the (meth)acrylic monovinyl monomer unit is preferably 50% by mass or more, more preferably 70% by mass or more, and still more preferably 90% by mass or more. The polar resin is particularly preferably an acrylic resin such that all the repeating units constituting the resin are composed of the (meth)acrylic monovinyl monomer unit.

In the polar resin, from the viewpoint of easily controlling the particle diameter of the hollow particles, it is preferable that the heteroatom-containing monomer unit contains a polar group-containing monomer unit that contains a polar group selected from a carboxyl group, a hydroxyl group, a sulfonic acid group, an amino group, a polyoxyethylene group and an epoxy group. As the polar group-containing monomer used in the polar resin, examples include, but are not limited to, polar group-containing, non-crosslinkable monomers described below. The polar group-containing monomers may be used alone or in combination of two or more. As the polar group contained in the polar group-containing monomer unit contained in the polar resin, a carboxyl group and a hydroxyl group are preferred, from the point of view that the particle diameter can be controlled by adding a small amount thereof.

When the polar resin contains the polar group-containing monomer unit, it is preferable that the polar group is present at the end of the main chain or that of a side chain, or the polar group is bound to the main chain or a side chain in a pendant form, from the point of view that the polar resin can be easily disposed on the outer surface of the hollow particles and that the particle diameter of the hollow particles can be easily controlled.

When the polar resin does not contain the polar group-containing monomer unit, from the viewpoint of high compatibility with the polymerizable monomer and easily controlling the particle diameter of the hollow particles, the polar resin preferably contains a monomer unit derived from a (meth)acrylic acid alkyl ester as the heteroatom-containing monomer unit. Especially from the viewpoint of high polarity, the polar resin preferably contains a monomer unit derived from a (meth)acrylic acid alkyl ester in which the alkyl group has 3 or less carbon atoms, more preferably a monomer unit derived from a (meth)acrylic acid alkyl ester in which the alkyl group is a methyl group or an ethyl group, and still more preferably a monomer unit derived from a (meth)acrylic acid alkyl ester in which the alkyl group is a methyl group.

From the viewpoint of high compatibility with the polymerizable monomer and easily controlling the particle diameter of the hollow particles, the acrylic resin as the polar resin is preferably a polymer or copolymer of polymerizable monomers for polar resin, which include 50.0% by mass or more of methyl methacrylate with respect to the total mass (100% by mass) of the polymerizable monomers for polar resin. In the present disclosure, the polymerizable monomer used for synthesis of the polar resin is referred to as the "polymerizable monomer for polar resin".

From the viewpoint of easily controlling the particle diameter of the hollow particles, the acrylic resin as the polar resin is more preferably a copolymer of polymerizable monomers for polar resin, which include 50.0% by mass or more and 99.9% by mass or less of methyl methacrylate and 0.1% by mass or more and 5.0% by mass or less of the polar group-containing monomer; the acrylic resin as the polar resin is still more preferably a copolymer of polymerizable monomers for polar resin, which include 50.0% by mass or more and 99.0% by mass or less of methyl methacrylate and 0.1% by mass or more and 5.0% by mass or less of the polar group-containing monomer; the acrylic resin as the polar resin is even more preferably a copolymer of polymerizable monomers for polar resin, which include 50.0% by mass or more and 98.0% by mass or less of methyl methacrylate, 1.0% by mass or more and 5.0% by mass or less of a (meth)acrylic monovinyl monomer which is different from methyl methacrylate and which does not contain the polar group and 0.1% by mass or more and 5.0% by mass or less of the polar group-containing monomer; and the acrylic resin as the polar resin is particularly preferably a copolymer of polymerizable monomers for polar resin, which include 50.0% by mass or more and 98.0% by mass or less of methyl methacrylate, 1.0% by mass or more and 5.0% by mass or less of a (meth)acrylic monovinyl monomer which is different from methyl methacrylate and which does not contain the polar group and 0.2% by mass or more and 3.0% by mass or less of the polar group-containing monomer.

From the point of view that the glass transition point of the polar resin can be controlled, the (meth)acrylic monovinyl monomer which is different from methyl methacrylate and which does not contain the polar group, is preferably at least one selected from ethyl acrylate and butyl acrylate, and particularly preferably ethyl acrylate.

From the viewpoint of compatibility with the polymerizable monomer in the mixture liquid, the polar group-containing monomer is preferably a (meth)acrylic monovinyl monomer containing the polar group. From the point of view that the particle diameter can be controlled by adding a small amount thereof, the polar group-containing monomer is preferably a (meth)acrylic monovinyl monomer containing a carboxyl group or a hydroxyl group.

The polar resin can be obtained by, for example, polymerizing polymerizable monomers for polar resin, which include the heteroatom-containing monomer, by a polymerization method such as solution polymerization and emulsion polymerization.

When the polar resin is a copolymer, the copolymer may be any one of a random copolymer, a block copolymer and a graft copolymer. The polar resin is preferably a random copolymer.

From the viewpoint of increasing the solubility, the polar resin is preferably finely pulverized.

The number average molecular weight (Mn) of the polar resin is not particularly limited. The polystyrene equivalent number average molecular weight (Mn) of the polar resin measured by gel permeation chromatography (GPC) using tetrahydrofuran is preferably in a range of 3000 or more and 20000 or less, more preferably in a range of 4000 or more and 17000 or less, and still more preferably in a range of 6000 or more and 15000 or less. When the number average molecular weight (Mn) of the polar resin is equal to or more than the lower limit value, the solubility of the polar resin is increased, and the particle diameter of the hollow particles can be easily controlled. When the number average molecular weight of the polar resin is equal to or less than the upper limit value, a decrease in the strength of the shell can be suppressed.

When the polar resin is used as the particle diameter control agent, the content of the polar resin is preferably 0.1 parts by mass or more, more preferably 0.3 parts by mass or more, still more preferably 0.4 parts by mass or more, and even more preferably 0.5 parts by mass or more, with respect to 100 parts by mass of the polymerizable monomer in the mixture liquid. On the other hand, the content of the polar resin is preferably 10.0 parts by mass or less, more preferably 8.0 parts by mass or less, still more preferably 5.0 parts by mass or less, and even more preferably 2.0 parts by mass or less. When the content of the polar resin is equal to or more than the lower limit value, the particle diameter of the hollow particles and the thickness of the shell can be easily controlled. When the content of the polar resin is equal to or less than the upper limit value, a decrease in the content of the polymerizable monomer can be suppressed. Accordingly, a decrease in the strength of the shell can be suppressed.

The rosin acids can be obtained from rosin such as gum rosin, tall rosin and wood rosin.

The components contained in the rosin acids obtained from the rosin are, for example, abietic acid, dehydroabietic acid, palustric acid, isopimaric acid and pimaric acid. The component ratio of the rosin acids is diverse, and it varies depending on the type of the rosin, the type and growing area of pine which is a raw material of rosin, etc.

The rosin acids and metal salts thereof are preferably rosin acids containing 50% by mass or more of an abietic acid compound such as abietic acid, dehydroabietic acid, palustric acid and hydrides thereof, and alkali metal salts of the rosin acids.

The higher fatty acids are preferably higher fatty acids containing 10 to 25 carbon atoms in which the carbon atom of the carboxyl group is excluded. As such higher fatty acids, for example, lauric acid ($CH_3(CH_2)_{10}COOH$), tridecanoic acid ($CH_3(CH_2)_{11}COOH$), myristic acid ($CH_3(CH_2)_{14}COOH$), pentadecanoic acid ($CH_3(CH_2)_{13}COOH$), palmitic acid ($CH_3(CH_2)_{14}COOH$), heptadecanoic acid ($CH_3(CH_3)_{15}COOH$), stearic acid ($CH_3(CH_2)_{16}COOH$), arachidic acid ($CH_3(CH_2)_{18}COOH$), behenic acid ($CH_3(CH_2)_{20}COOH$) and lignoceric acid ($CH_3(CH_2)_{22}COOH$) are preferred.

As the metal used in the metal salts of the rosin acid or higher fatty acids, examples include, but are not limited to, an alkali metal such as Li, Na and K, and an alkaline-earth metal such as Mg and Ca. Of them, an alkali metal is preferred, and at least one selected from Li, Na and K is more preferred.

When at least one selected from the group consisting of rosin acids, higher fatty acids and metal salts thereof is used as the particle diameter control agent, the total content of the rosin acids, higher fatty acids and metal salts thereof on the surface of the hollow particles is controlled to be 200 ppm or less.

The total content of the rosin acids, higher fatty acids and metal salts thereof is preferably 0.0001 parts by mass or more and 0.02 parts by mass or less, more preferably 0.001 parts by mass or more and 0.01 parts by mass or less, and still more preferably 0.0015 parts by mass or more and 0.006 parts by mass or less, with respect to the total (100 parts by mass) of the polymerizable monomer and the hydrophobic solvent in the mixture liquid. When the total content is equal to or more than the lower limit value, the particle diameter of the hollow particles and the thickness of the shell can be easily controlled.

The mixture liquid is obtained by mixing the above-mentioned materials and other materials as needed, appropriately stirring the mixture, etc. In the mixture liquid, an oil phase containing the lipophilic materials such as (A) the polymerizable monomer, (B) the hydrophobic solvent and (C) the polymerization initiator is dispersed with a size of a particle diameter of approximately several millimeters in an aqueous phase containing (D) the dispersion stabilizer, (E) the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the polymerizable monomer, the hydrophobic solvent and the polymerization initiator with the aqueous phase containing the dispersion stabilizer and the aqueous medium in advance, and then mixing the phases together. In the present disclosure, a colloidal dispersion in which a sparingly water-soluble inorganic dispersion stabilizer is dispersed in the form of colloidal particles in the aqueous medium, can be preferably used as the aqueous phase.

As just described, by separately preparing the oil phase and the aqueous phase in advance and then mixing them, hollow particles such that the composition of the shell portion is uniform, can be produced. Also, the particle diameter of the hollow particles can be easily controlled.

In the method for producing the hollow particles according to the present disclosure, the content of the surfactant in all solid content contained in the mixture liquid, is preferably 200 ppm or less.

The surfactant may be, for example, an anionic surfactant, a nonionic surfactant, a cationic surfactant or an amphoteric surfactant. The surfactant may be a conventionally-known surfactant.

As the anionic surfactant, examples include, but are not limited to, carboxylates such as alkali metal salts of a higher fatty acid; sulfates such as higher alcohol sulfates and higher alkyl ether sulfates; sulfonates such as alkylbenzene sulfonates, alkyl sulfonates and paraffin sulfonates; and phosphates such as higher alcohol phosphates.

As the nonionic surfactant, examples include, but are not limited to, a polyethylene glycol-type nonionic surfactant such as a higher alcohol ethylene oxide adduct, a fatty acid ethylene oxide adduct, a higher alkylamine ethylene oxide adduct and a polypropylene glycol ethylene oxide adduct, and a polyhydric alcohol nonionic surfactant such as polyethylene oxide, a fatty acid ester of glycerin, a fatty acid ester of pentaerythritol, a fatty acid ester of sorbit or sorbitan, an alkyl ether of polyhydric alcohol, and an aliphatic amide of alkanolamine.

As the cationic surfactant, examples include, but are not limited to, a quaternary ammonium salt such as an alkyltrimethylammonium salt.

As the amphoteric surfactant, examples include, but are not limited to, an amino acid-type amphoteric surfactant such as a higher alkyl higher alkyl aminopropionate, and a betaine-type amphoteric surfactant such as a higher alkyl dimethyl betaine and a higher alkyl dihydroxyethyl betaine.

Also in the present disclosure, the surfactant encompasses a high-molecular-weight compound having both a hydrophilic group and a hydrophobic group, such as polyvinyl alcohol, methyl cellulose, ethyl cellulose, polyacrylic acid, polyacrylimide, polyethylene oxide, and poly(hydroxystearic acid-g-methyl methacrylate-co-methacrylic acid) copolymer.

The molecular weight of the surfactant is not particularly limited. It is generally less than 3000.

(2) Suspension Step

The suspension step includes suspending the mixture liquid to prepare the suspension in which the droplets of the monomer composition containing the hydrophobic solvent are dispersed in the aqueous medium.

The suspension method for forming the droplets of the monomer composition is not particularly limited. For example, it is performed using an apparatus capable of performing strong stirring, such as an in-line type emulsifying disperser (e.g., a horizontal in-line type disperser such as MILDER (product name, manufactured by Pacific Machinery & Engineering Co., Ltd.) and CAVITRON (product name, manufactured by EUROTEC, Ltd.) and a vertical in-line type disperser such as DRS 2000/5 (product name, manufactured by IKA Works, Inc.)) and a high-speed emulsifying disperser such as T.K. HOMOMIXER MARK II (product name, manufactured by PRIMIX Corporation).

In the suspension prepared in the suspension step, the droplets of the monomer composition containing the lipophilic materials mentioned above and having a particle diameter of from 1 μm to 10 μm, are dispersed uniformly in the aqueous medium. Such droplets of the monomer composition are difficult to observe with the naked eye and can be observed with a known observation instrument such as an optical microscope.

In the suspension step, since phase separation occurs in the droplets of the monomer composition, the hydrophobic solvent with low polarity is likely to collect in the interior of the droplets. As a result, in the obtained droplets, the hydrophobic solvent is distributed in the interior thereof, and the material not containing the hydrophobic solvent, such as the polymerizable monomer, is distributed at the periphery thereof.

FIG. 2 is a schematic diagram showing an embodiment of the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a state where the droplets 10 of the monomer composition and the polymerizable monomer 4c dispersed in the aqueous medium 1, are dispersed in the aqueous medium 1. Each droplet 10 is formed by the oil-soluble monomer composition 4 and a dispersion stabilizer (not illustrated) surrounding the periphery of the oil-soluble monomer composition 4.

The monomer composition 4 contains the oil-soluble polymerization initiator 5, the polymerizable monomer and the hydrophobic solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessively growing the minute oil droplet.

In such a suspension polymerization method using the oil-soluble polymerization initiator, there is no opportunity for the polymerization initiator to come into contact with the polymerizable monomer 4c dispersed in the aqueous medium 1. Thus, the subgeneration of surplus resin particles (e.g., solid particles having a relatively small particle diameter) in addition to the target resin particles having the hollow portion, can be suppressed by using the oil-soluble polymerization initiator.

(3) Polymerization Step

The polymerization step includes subjecting the suspension obtained by the suspension step to a polymerization reaction to prepare a precursor composition containing precursor particles which have a hollow portion surrounded by a shell containing a resin and which include the hydrophobic solvent in the hollow portion. The precursor particles are formed by polymerization of the polymerizable monomer contained in the droplets of the monomer composition. The shell of the precursor particles contains the polymer of the polymerizable monomer as the resin.

The polymerization system is not particularly limited. For example, a batch system, a semicontinuous system or a continuous system may be employed.

The polymerization temperature is preferably from 40° C. to 80° C., and more preferably from 50° C. to 70° C.

The temperature increase rate up to the polymerization temperature, is preferably from 10° C./h to 60° C./h, and more preferably from 15° C./h to 55° C./h.

The polymerization reaction time is preferably from 1 hour to 20 hours, and more preferably from 2 hours to 15 hours.

In the polymerization step, the shell portion of the droplets of the monomer composition, which contain the hydrophobic solvent in the interior, polymerizes. Accordingly, as described above, the hollow portion filled with the hydrophobic solvent is formed in the interior of the obtained precursor particles.

In this step, the second polymerization reaction may be performed by further adding a polymerizable monomer to the precursor composition obtained by the first polymerization reaction performed by subjecting the suspension to the polymerization reaction. As just described, by performing the two-step polymerization reaction in the polymerization step, the solvent resistance of the hollow particles can be increased.

The first polymerization reaction is preferably continued until the polymerization conversion rate of the polymerizable monomer in the suspension reaches preferably 93% by mass or more, more preferably 95% by mass or more, still more preferably 98% by mass or more, and even more preferably 99% by mass or more.

In the present disclosure, the polymerization conversion rate is obtained by the following formula (B) using the mass of the solid component of the precursor particles in the precursor composition obtained by the first polymerization reaction and the mass of the polymerizable monomer remaining unreacted after the first polymerization reaction. The mass of the unreacted polymerizable monomer can be measured by gas chromatography (GC).

Polymerization conversion rate (% by mass)=100−
(Mass of the unreacted polymerizable monomer/Mass of the solid component of the precursor particles)×100       Formula (B)

The polymerization reaction time of the first polymerization reaction is preferably from 0.5 hours to 5 hours, and more preferably from 1 hour to 3 hours.

The polymerizable monomer added in the second polymerization reaction is not particularly limited. From the viewpoint of increasing the solvent resistance and strength of the hollow particles, the polymerizable monomer is preferably a polymerizable monomer having a solubility of 0.3 g/L or more in distilled water at 20° C., and more preferably a non-crosslinkable monomer having a solubility of 0.3 g/L or more in distilled water at 20° C. The polymerizable monomer added in the second polymerization reaction is preferably an (meth)acrylic acid alkyl ester containing an alkyl group having 1 to 5 carbon atoms, a (meth)acrylamide and derivatives thereof, (meth)acrylic acid nitrile, and a polar group-containing non-crosslinkable monomer, for example. The polymerizable monomer is more preferably at least one selected from the group consisting of a (meth)acrylic acid alkyl ester containing an alkyl group having 1 to 5 carbon atoms, and (meth)acrylic acid nitrile. The polymerizable monomer is still more preferably at least one selected from the group consisting of methyl (meth)acrylate, ethyl (meth)acrylate, butyl (meth)acrylate and acrylic acid nitrile.

For example, the polar group-containing non-crosslinkable monomer is preferably a non-crosslinkable monomer containing a polar group selected from a carboxyl group, a hydroxyl group, a sulfonic acid group, an amino group, a polyoxyethylene group and an epoxy group. As such a non-crosslinkable monomer, examples include, but are not limited to, a carboxyl group-containing monomer such as an ethylenically unsaturated carboxylic acid monomer such as (meth)acrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth)acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether.

The molecular weight of the polymerizable monomer added in the second polymerization reaction is not particularly limited. From the viewpoint of increasing the solvent resistance and strength of the hollow particles, it is preferably 200 or less, and more preferably 100 or less. The lower limit of the molecular weight is not particularly limited, and it is generally 50 or more.

From the viewpoint of increasing the solvent resistance and strength of the hollow particles, the amount of the polymerizable monomer added in the second polymerization reaction is preferably from 3 parts by mass to 15 parts by mass, and more preferably from 4 parts by mass to 10 parts by mass, with respect to 100 parts by mass of the polymerizable monomer in the mixture liquid.

The polymerization reaction time of the second polymerization reaction is preferably from 1 hour to 6 hours, and more preferably from 2 hours to 4 hours.

By performing the two-step polymerization reaction as described above in the polymerization step, in the thus-obtained hollow particles, the amount of the residual unreacted polymerizable monomer can be controlled to preferably 750 ppm or less, more preferably 500 ppm or less, and still more preferably 300 ppm or less.

In the present disclosure, the amount of the residual unreacted polymerizable monomer means the ratio of the mass of the polymerizable monomer remaining unreacted to the mass of the solid component of the hollow particles. The mass of the unreacted polymerizable monomer can be measured by gas chromatography (GC).

(4) Washing and Solid-Liquid Separation Step

The washing and solid-liquid separation step includes carrying out washing for removal of the dispersion stabilizer remaining in the precursor composition which contains the precursor particles and which is obtained by the above-described polymerization step, and then performing solid-liquid separation of the precursor composition to obtain a solid component containing the precursor particles.

The washing for removal of the dispersion stabilizer remaining in the precursor composition can be carried out by, for example, adding acid or alkali to the precursor composition. When the dispersion stabilizer used is an acid-soluble inorganic compound, the washing is preferably carried out by adding acid to the precursor composition containing the precursor particles. When the dispersion stabilizer used is an alkali-soluble inorganic compound, the washing is preferably carried out by adding alkali to the precursor composition containing the precursor particles.

When the acid-soluble inorganic compound is used as the dispersion stabilizer, the pH of the precursor composition is preferably controlled to 6.5 or less, and more preferably 6 or less, by adding acid to the precursor composition containing the precursor particles. As the added acid, an inorganic acid such as sulfuric acid, hydrochloric acid and nitric acid or an organic acid such as formic acid and acetic acid may be used. Of them, sulfuric acid is particularly preferred, due to its high dispersion stabilizer removal efficiency and small influence on production equipment.

By carrying out the washing described above, the content of the metal contained in the shell can be decreased.

The method of performing the solid-liquid separation of the precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, by use of a drying apparatus such as a dryer and a drying appliance such as a hand dryer.

(5) Solvent Removal Step

The solvent removal step includes removing the hydrophobic solvent from the precursor particles obtained by the solid-liquid separation step.

By removing the hydrophobic solvent from the precursor particles in a gaseous atmosphere, the hydrophobic solvent in the interior of the precursor particles is substituted with air, and the hollow particles filled with gas are obtained.

In this step, the term "in a gaseous atmosphere" includes "in an environment where no liquid component exists in the outside of the precursor particles" and "in an environment where only a very small amount of liquid component at a level that does not influence the removal of the hydrophobic solvent, exists in the outside of the precursor particles" in a strict sense. The term "in a gaseous atmosphere" can be reworded as a state where the precursor particles do not exist in a slurry, or it can be reworded as a state where the precursor particles exist in a dry powder. That is, in this step, it is important to remove the hydrophobic solvent in an environment where the precursor particles come into direct contact with the outside gas.

The method of removing the hydrophobic solvent from the precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrophobic solvent and less than or equal to the highest temperature at which the shell structure of the precursor particles does not collapse. Accordingly, depending on the composition of the shell and the type of the hydrophobic solvent in the precursor particles, the heating temperature may be from 50° C. to 200° C., may be from 70° C. to 200° C., or may be from 100° C. to 200° C., for example.

The hydrophobic solvent in the interior of the precursor particles is substituted with the outside gas by the drying operation in the gaseous atmosphere. As a result, the hollow particles in which the hollow portion is occupied by gas, are obtained.

The drying atmosphere is not particularly limited and may be appropriately selected depending on the intended application of the hollow particles. Possible examples of the drying atmosphere include air, oxygen, nitrogen and argon.

The hydrophobic solvent included in the precursor particles can be removed as follows, for example: instead of subjecting the precursor composition to solid-liquid separation, in the slurry containing the precursor particles and the aqueous medium, the hydrophobic solvent included in the precursor particles is substituted with the aqueous medium of the slurry, thereby removing the hydrophobic solvent. The method of removing the hydrophobic solvent from the precursor particles in a gaseous atmosphere is preferred from the point of view that the content of the metal in the shell can be decreased.

(6) Others

In addition to the steps (1) to (5) mentioned above, the method for producing the hollow particles may further include a hollow portion re-substitution step, for example.

The hollow portion re-substitution step includes resubstituting the gas or liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

2. Hollow Particles

The hollow particles of the present disclosure are hollow particles which comprise the shell containing the resin and the hollow portion surrounded by the shell, wherein the shell contains, as the resin, the polymer in which from 70 parts by mass to 100 parts by mass of the crosslinkable monomer unit is contained in 100 parts by mass of all monomer units;

wherein the void ratio is 60% or more;

wherein the content of the surfactant present on the surface of the hollow particles is 200 ppm or less; and wherein the relative permittivity at a frequency of 1 MHz is 1.6 or less.

For the hollow particles of the present disclosure, the relative permittivity at a frequency of 1 MHz is 1.6 or less. From the viewpoint of decreasing the permittivity, the relative permittivity at a frequency of 1 MHz is preferably 1.5 or less. The lower limit of the relative permittivity of the hollow particles of the present disclosure is not particularly limited, and it is generally 1.0 or more.

In the present disclosure, the relative permittivity of the hollow particles is measured by use of a perturbation-type measuring device, at a measurement frequency of 1 MHz.

For the hollow particles of the present disclosure, the content of the surfactant present on the surface of the hollow particles is 200 ppm or less, more preferably 100 ppm or less, and still more preferably 50 ppm or less. When the surfactant is used in the production process of the hollow particles, for example, when the surfactant is added to the mixture liquid, the surfactant may remain on the surface of the obtained hollow particles. By not using the surfactant as the dispersion stabilizer in the production process of the hollow particles, the content of the surfactant present on the surface of the hollow particles can be controlled to 200 ppm or less.

In the present disclosure, the content of the surfactant present on the surface of the hollow particles means the ratio of the mass of the surfactant present on the surface of the hollow particles, with respect to the mass of the hollow particles. The surfactant present on the surface of the hollow particles can be extracted by, for example, sonicating the hollow particles in water. The type and mass of the surfactant extracted into the water can be specified from the peak position and peak intensity of $^1$H-NMR spectrum.

For the hollow particles of the present disclosure, the content of the metal is preferably 100 ppm or less, more preferably 80 ppm or less, and still more preferably 70 ppm or less. Here, the metal includes a metal ion. By decreasing the content of the metal, the performance stability of the hollow particles in a high-humidity environment can be increased. By decreasing both the content of the surfactant and the content of the metal to the above-described upper limit values or less, the performance stability of the hollow particles of the present disclosure can be increased beyond the sum of the effect which is exerted by decreasing the content of the surfactant and the effect which is exerted by decreasing the content of the metal.

In the present disclosure, the content of the metal in the hollow particles means the ratio of the total mass of the metal components contained in the hollow particles with respect to the mass of the hollow particles.

The content of the metal contained in the hollow particles can be measured by ICP optical emission spectroscopy. The metal species can be specified by X-ray fluorescence spectrometry (XRF).

The shell of the hollow particles of the present disclosure contains, as the resin, the polymer in which from 70 parts by mass to 100 parts by mass of the crosslinkable monomer unit is contained in 100 parts by mass of all monomer units. Accordingly, the hollow particles of the present disclosure are excellent in strength, are less likely to collapse, and are less likely to deform even when heat or the like is applied from the outside. In addition, an increase in the relative permittivity due to a collapse or deformation of the hollow particles is suppressed.

The polymer forms the framework of the shell of the hollow particles. In the polymer, when the content of the crosslinkable monomer unit is less than 100 parts by mass, the monomer unit other than the crosslinkable monomer unit is a non-crosslinkable monomer unit.

The polymer contained in the shell of the hollow particles of the present disclosure, which are obtained by the above-described method for producing the hollow particles, is obtained by polymerizing the polymerizable monomer described above. The crosslinkable monomer unit or non-crosslinkable monomer unit contained in the polymer is derived from the above-described polymerizable monomer. Accordingly, the content of each monomer unit in the polymer can be calculated from the amount of each polymerizable monomer subjected to the polymerization reaction.

All monomer units of the polymer may be crosslinkable monomer units. However, when the polymer contains the crosslinkable monomer unit in combination with the non-crosslinkable monomer unit, the lower limit of the content of the crosslinkable monomer unit in 100 parts by mass of all monomer units, is preferably 80 parts by mass or more, and more preferably 90 parts by mass or more. On the other hand, the upper limit is preferably 99 parts by mass or less, and more preferably 97 parts by mass.

As the crosslinkable monomer unit, the polymer preferably contains a bifunctional crosslinkable monomer unit. From the viewpoint of further increasing the strength of the hollow particles, the polymer more preferably contains a bifunctional crosslinkable monomer unit in combination with a trifunctional or higher-functional crosslinkable monomer unit.

The content of the bifunctional crosslinkable monomer unit in 100 parts by mass of all monomer units of the polymer, is not particularly limited. The lower limit of the content of the bifunctional crosslinkable monomer unit is preferably 50 parts by mass or more, and more preferably 60 parts by mass or more. On the other hand, the upper limit is preferably 90 parts by mass or less, and more preferably 80 parts by mass or less.

When the polymer contains a trifunctional or higher-functional crosslinkable monomer unit, the content of the trifunctional or higher-functional crosslinkable monomer unit in 100 parts by mass of all monomer units of the polymer, is not particularly limited. The lower limit of the content of the trifunctional or higher-functional crosslinkable monomer unit is preferably 5 parts by mass or more, more preferably 10 parts by mass or more, and still more preferably 20 parts by mass or more. On the other hand, the upper limit is preferably 40 parts by mass or less, and more preferably 30 parts by mass or less.

The content of the non-crosslinkable monomer unit in 100 parts by mass of all monomer units of the polymer, is 30 parts by mass or less. From the viewpoint of increasing the strength of the hollow particles and suppressing an increase in the relative permittivity due to a collapse or deformation of the hollow particles, the upper limit of the content of the non-crosslinkable monomer unit is preferably 20 parts by mass or less, and more preferably 10 parts by mass or less. From the viewpoint of increasing the solvent resistance, the lower limit is preferably 1 part by mass or more, and more preferably 3 parts by mass or more.

The content of the polymer in the hollow particles of the present disclosure, is preferably 90% by mass or more, and more preferably 95% by mass or more, in the total solid content (100% by mass) of the shell. By controlling the content of the polymer to the lower limit value or more, the strength of the hollow particles can be increased, and an increase in the relative permittivity due to a collapse or deformation of the hollow particles can be suppressed.

As the particle diameter control agent, the shell of the hollow particles of the present disclosure may further contain the polar resin or at least one selected from the group consisting of the rosin acids, higher fatty acids and metal salts thereof.

When the shell of the hollow particles of the present disclosure contains the polar resin as the particle diameter control agent, in the total solid content (100% by mass) of the shell, the content of the polar resin is preferably 0.1% by mass or more, more preferably 0.3% by mass or more, still more preferably 0.4% by mass or more, and even more preferably 0.5% by mass or more. On the other hand, the content of the polar resin is preferably 10.0% by mass or less, more preferably 8.0% by mass or less, still more preferably 5.0% by mass, and even more preferably 2.0% by mass or less.

When the shell of the hollow particles of the present disclosure contains at least one selected from the group consisting of the rosin acids, higher fatty acids and metal salts thereof, in the total solid content (100% by mass) of the shell, the total content of the rosin acids, higher fatty acids and metal salts thereof is preferably from 0.0001% by mass to 0.02% by mass, more preferably from 0.0010% by mass to 0.01% by mass, and still more preferably from 0.0015% by mass to 0.006% by mass.

The presence and content of the particle diameter control agent in the shell of the hollow particles, can be confirmed by pyrolysis-gas chromatography, for example.

In the present disclosure, the lower limit of the volume average particle diameter of the hollow particles is preferably 1 μm or more, more preferably 1.5 μm or more, and still more preferably 2 μm or more. On the other hand, the upper limit of the volume average particle diameter of the hollow particles is preferably 10 μm or less, more preferably 8 μm or less, and still more preferably 6 μm or less. When the volume average particle diameter of the hollow particles is equal to or more than the lower limit value, the aggregability of the hollow particles decreases, and the hollow particles exert excellent dispersibility, accordingly. When the volume average particle diameter of the hollow particles is equal to or less than the upper limit value, shell thickness non-uniformity is suppressed, and a uniform shell is easily formed. In addition, the hollow particles obtain high mechanical strength, and they are less likely to collapse. Accordingly, an increase in the relative permittivity due to the collapse or deformation of the hollow particles can be suppressed. When the volume average particle diameter is within the above range, the hollow particles do not cause a wiring failure even if they are incorporated in the insulation resin layer of an electronic circuit board. Accordingly, the hollow particles are preferably used as an electronic circuit board material.

To control the volume average particle diameter of the hollow particles within the above-mentioned preferred range, for example, it is preferable to use the combination of the above-mentioned preferred dispersion stabilizer and particle diameter control agent in the mixture liquid preparation step, and it is also preferable to use the above-mentioned preferred hydrophobic solvent.

The shape of the hollow particles of the present disclosure is not particularly limited, as long as the hollow portion is formed in the interior. As the shape, examples include, but are not limited to, a spherical shape, an ellipsoidal shape and an irregular shape. Among them, a spherical shape is preferable in terms of ease of production.

The hollow particles of the present disclosure may have one or two or more hollow portions. From the viewpoint of maintaining good balance between high void ratio and mechanical strength and from the viewpoint of decreasing the permittivity, the hollow particles preferably have only one hollow portion.

The average circularity of the hollow particles of the present disclosure may be from 0.950 to 0.995.

An example of the image of the shape of the hollow particles of the present disclosure, is a bag made of a thin film and inflated with gas. A cross-section of the bag is like the hollow particle 100 shown in the diagram (5) of FIG. 1. In this example, one thin film is provided on the outside, and the interior is filled with gas.

The shape of the particles can be determined by SEM or TEM, for example. Further, the shape of the interior of the particles can be determined by SEM or TEM after cutting the particles into round slices by a known method.

The particle size distribution (volume average particle diameter (Dv)/number average particle diameter (Dn)) of the hollow particles may be 1.05 or more and 2.5 or less, for example. When the particle size distribution is 2.5 or less, hollow particles such that compressive strength and heat resistance slightly vary between the hollow particles, can be obtained. When the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a particle size distribution measuring apparatus; the number average and volume average of the particle diameters are calculated; and the obtained values can be used as the number average particle diameter (Dn) and volume average particle diameter (Dv) of the hollow particles. The particle size distribution is found by dividing the volume average particle diameter by the number average particle diameter.

The void ratio of the hollow particles of the present disclosure is 60% or more, and preferably 65% or more. When the void ratio is equal to or more than the lower limit value, the relative permittivity of the hollow particles is sufficiently decreased, and the hollow particles obtain excellent lightness in weight, excellent heat resistance and excellent heat insulation properties. The upper limit of the void ratio of the hollow particles of the present disclosure is not particularly limited. From the viewpoint of suppressing a decrease in the strength of the hollow particles, the upper limit is preferably 90% or less, and more preferably 85% or less.

The void ratio of the hollow particles of the present disclosure can be calculated from the apparent density $D_1$ and true density $D_0$ of the hollow particles.

A method for measuring the apparent density $D_1$ of the hollow particles is as follows. First, approximately 30 cm³ of the hollow particles are introduced into a measuring flask with a volume of 100 cm³, and the mass of the introduced hollow particles is precisely weighed. Next, the measuring flask in which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm³) of the hollow particles is calculated by the following formula (I).

Apparent density $D_1$=[Mass of the hollow particles]/ (100−[Mass of the isopropanol]/[Specific gravity of the isopropanol at the measuring temperature])     Formula (I)

The apparent density $D_1$ is equivalent to the specific gravity of the whole hollow particle in the case where the hollow portion is regarded as a part of the hollow particle.

A method for measuring the true density $D_n$ of the hollow particles is as follows. The hollow particles are pulverized in advance; approximately 10 g of the pulverized hollow particles are introduced into a measuring flask with a volume of 100 cm³; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm³) of the hollow particles is calculated by the following formula (II).

True density $D_0$=[Mass of the pulverized hollow particles]/(100−[Mass of the isopropanol]/[Specific gravity of the isopropanol at the measuring temperature])     Formula (II)

The true density $D_0$ is equivalent to the specific gravity of the shell portion alone of the hollow particle. As is clear from the measurement method mentioned above, when calculating the true density Do, the hollow portion is not regarded as a part of the hollow particle.

The void ratio (%) of the hollow particles is calculated by the following formula (III) where $D_1$ is the apparent density of the hollow particles and $D_0$ is the true density thereof.

Void ratio (%)=100−(Apparent density $D$/True density $D_0$)×100     Formula (III)

The void ratio of the hollow particle can be reworded as the ratio occupied by the hollow portion in the specific gravity of the hollow particle.

The hollow particles of the present disclosure have excellent strength, since the shell contains a sufficient amount of the crosslinkable monomer unit. Due to the excellent strength, the hollow particles of the present disclosure are less likely to collapse when mixed and kneaded with other materials and even when molded after mixing and kneading with other materials. When they are added to a molded body, they exert excellent effects as a weight reducing material, a heat insulation material, an acoustic insulation material, a damping material and so on. In the hollow particles of the present disclosure, the amount of the residual hydrophobic solvent is reduced. Accordingly, ignition or smoke is not likely to occur when the hollow particles are mixed and kneaded with other materials such as resin. Accordingly, the hollow particles of the present disclosure are particularly suitable as an additive for molded body, and they are particularly suitable used as an additive for molded body made of a resin.

The molded body containing the hollow particles of the present disclosure may contain, as the resin, thermoplastic or thermosetting resin such as polyethylene, polypropylene, polyvinyl chloride, polystyrene, polyurethane, epoxy resin, acrylonitrile-butadiene-styrene (ABS) resin, acrylonitrile-styrene (AS) resin, poly(meth)acrylate, polycarbonate, polyamide, polyimide, polyphenylene ether, polyphenylene sulfide, polyester, polytetrafluoroethylene, maleimide resin, bismaleimide triazine resin, liquid crystalline polyester resin, phenolic resin, vinyl ester resin, unsaturated polyester resin, cyanate ester resin, polyetherketoneketone resin and polyetherimide resin. When epoxy resin is used as the resin component, it is preferable to appropriately mix the resin with a catalyst or a curing agent such as an amine, an acid anhydride and an imidazole. The molded body containing the hollow particles of the present disclosure may further contain organic or inorganic fibers such as carbon fibers, glass fibers, aramid fibers and polyethylene fibers. The hollow particles of the present disclosure can be contained as a filler in a molded body formed by use of a thermoplastic or thermosetting resin and in a molded body formed by use of a material containing fibers and a thermoplastic or thermosetting resin.

As the applications of the molded body made of a resin containing the hollow particles of the present disclosure, examples include, but are not limited to, members such as a light reflective material, a heat insulation material, a sound insulation material and a low dielectric material, which are used in various kinds of fields such as the automotive field, the electronic field, the electric field, the architecture field, the aviation field and the space field; food containers; footwears such as sports shoes and sandals; components of household appliances; components of bicycles; stationery supplies; and tools. Due to having excellent performance stability in a high-humidity environment and having low relative permittivity, the hollow particles of the present disclosure are particularly preferably used as a material having low permittivity and high reliability in the electronic or electrical field. For example, the hollow particles of the present disclosure are preferably used as an electronic circuit board material. More specifically, by incorporating the hollow particles of the present disclosure in the insulation resin layer of an electronic circuit board, the relative permittivity of the insulation resin layer can be decreased, and a failure in a high-humidity environment, such as migration, can be suppressed.

Also, the hollow particles of the present disclosure are preferably used as a material for semiconductor devices. The material is used, for example, for interlayer insulation materials, dry film resists, solder resists, bonding wires, magnet wires, semiconductor encapsulating materials, epoxy encapsulating materials, molded underfill materials, underfill materials, die bonding pastes, buffer coating materials, copper-clad laminates, flexible substrates, high frequency device modules, antenna modules or automotive radars. Of them, the hollow particles of the present disclosure are particularly preferably used as a material for semiconductor material devices, which is used for interlayer insulation materials, solder resists, magnet wires, epoxy encapsulating materials, underfill materials, buffer coating materials, copper-clad laminates, flexible substrates, high frequency device modules, antenna modules or automotive radars.

The hollow particles of the present disclosure have a high void ratio, are less likely to collapse, and have high heat resistance. Accordingly, the hollow particles have heat insulation properties and shock-absorbing properties (cushioning properties) required of an under-coating material, and they also have heat resistance in line with thermal paper uses. Further, the hollow particles of the present disclosure are useful as a plastic pigment that is excellent in gloss, hiding power, etc.

A useful component such as a perfume, a medicine, an agricultural chemical and an ink component can be enclosed in the interior of the hollow particles of the present disclosure by a means such as immersion treatment or depressurized or pressurized immersion treatment. Accordingly, the hollow particles in which such a useful component is enclosed, can be used for various applications in accordance with the component contained in the interior.

EXAMPLES

Hereinbelow, the present disclosure is described more specifically using examples and comparative examples. However, the present disclosure is not limited to these examples. Also, "part (s)" and "%" are on a mass basis unless otherwise specified.

Production Example 1: Production of Polar Resin a (MMA/AA/EA Copolymer)

First, 200 parts of toluene was put in a reaction container. While stirring the toluene, the gas inside the reaction container was sufficiently replaced with nitrogen. Then, the temperature of the toluene was raised to 90° C. Then, a mixed solution of 96.2 parts of methyl methacrylate (MMA), 0.3 parts of acrylic acid (AA), 3.5 parts of ethyl acrylate (EA) and 2.8 parts of t-butylperoxy-2-ethylhexanoate (manufactured by: Nippon Oil & Fats Co., Ltd., product name: PERBUTYL O) was added dropwise to the reaction container for two hours. Also, the condition of the mixture was maintained for 10 hours under toluene flux, thereby completing polymerization. Then, the solvent was removed by distillation under reduced pressure to obtain a polar resin A (an MMA/AA/EA copolymer).

Of the total mass (100%) of the repeating units constituting the obtained polar resin A (the MMA/AA/EA copolymer), the proportion of the MMA-derived repeating units was 96.2%; that of the AA-derived repeating units was 0.3%; and that of the EA-derived repeating units was 3.5%. The obtained polar resin A was water-insoluble, and the number average molecular weight of the polar resin A was 10000.

The number average molecular weight was obtained as a polystyrene equivalent molecular weight measured by gel permeation chromatography (GPC) in which tetrahydrofuran at a flow rate of 0.35 ml/min was used as a carrier. For the measurement, HLC8220 (manufactured by Tosoh Corporation) was used as the measurement device; three Shodex (registered trademark) KF-404HQ columns (manufactured by Showa Denko K. K.) were connected and used (column temperature 40° C.); detectors used were a refractive index detector and an ultraviolet detector; and molecular weight calibration was carried out on 12 points of standard polystyrene (500 to 3000000) manufactured by Polymer Laboratory Ltd.

Example 1

(1) Mixture Liquid Preparation Step

First, a mixture of the following materials was prepared as an oil phase.
Ethylene glycol dimethacrylate: 31.9 parts
Trimethylolpropane triacrylate: 13.7 parts
Polar resin A (an MMA/AA/EA copolymer): 0.2 parts
2,2'-Azobis(2,4-dimethylvaleronitrile) (an oil-soluble polymerization initiator manufactured by: FUJIFILM Wako Pure Chemical Corporation, product name: V-65): 1.04 parts
Hydrophobic solvent: Cyclohexane (54.5 parts)

In a stirring tank, at room temperature, an aqueous solution in which 5.5 parts of sodium hydroxide (an alkali metal hydroxide) was dissolved in 55 parts of ion-exchanged water, was gradually added under stirring to an aqueous solution in which 7.8 parts of magnesium chloride (a water-soluble polyvalent metal salt) was dissolved in 225 parts of ion-exchanged water, thereby preparing a magnesium hydroxide colloidal dispersion (a sparingly water-soluble metal hydroxide colloidal dispersion) (magnesium hydroxide: 4.0 parts). The obtained dispersion was used as an aqueous phase.

The aqueous phase and the oil phase were mixed, thereby preparing a mixture liquid.

(2) Suspension Step

The mixture liquid obtained in the mixture liquid preparation step was stirred with a disperser (product name: HOMO MIXER, manufactured by: PRIMIX Corporation) for one minute at a rotational frequency of 4,000 rpm to be suspended, thereby preparing a suspension in which monomer droplets including the hydrophobic solvent were dispersed in water.

(3) Polymerization Step

In a nitrogen atmosphere, the temperature of the suspension obtained in the suspension step was increased from 40° C. to 65° C. for 30 minutes (temperature increase rate: 50° C./hour), and then the suspension was stirred for one and a half hours in a temperature condition of 65° C., thereby performing the first polymerization reaction. In addition, 2.3 parts of methyl acrylate was added to the stirring tank, and in a nitrogen atmosphere, they were stirred for two and a half hours in a temperature condition of 65° C., thereby performing the second polymerization reaction. By the first and second polymerization reactions, a precursor composition was prepared, which was a slurry solution in which precursor particles including the hydrophobic solvent were dispersed in water.

(4) Washing and Solid-Liquid Separation Step

The precursor composition obtained in the polymerization step was washed with dilute sulfuric acid (25° C., 10 minutes) to bring the pH of the composition to 5.5 or less. Next, water was separated therefrom by filtration. Then, 200 parts of ion-exchanged water was added to the resultant to make a slurry again, and a water washing treatment (washing, filtration and dehydration) was repeatedly performed several times at 25° C. The resultant was separated by filtration, thereby obtaining a solid component. The obtained solid component was dried with a dryer at a temperature of 40° C., thereby obtaining the precursor particles including the hydrophobic solvent.

(5) Solvent Removal Step

The precursor particles obtained in the solid-liquid separation step were subjected to heating treatment for 6 hours with a vacuum dryer in a vacuum condition at 200° C. Then, the vacuum condition was changed to normal pressure by nitrogen, and the precursor particles were cooled to room temperature, thereby obtaining the hollow particles of Example 1. From the scanning electron microscopy observation result and void ratio value of the obtained hollow particles, the particles were confirmed to be spherical and to have a hollow portion.

Example 2

The hollow particles of Example 2 were produced in the same manner as Example 1, except that in the preparation of the oil phase in the (1) mixture liquid preparation step, the amount of the added polymerizable monomer and that of the added hydrophobic solvent were changed in accordance with Table 1.

Example 3

The hollow particles of Example 3 were produced in the same manner as Example 1, except that in the preparation of the aqueous phase in the (1) mixture liquid preparation step, the amount of the magnesium chloride (the water-soluble polyvalent metal salt) was changed from 7.8 parts to 15.7 parts; the amount of the sodium hydroxide (the alkali metal hydroxide) was changed from 5.5 parts to 11.0 parts; and the amount of the magnesium hydroxide in the magnesium hydroxide colloid was controlled to 8.0 parts.

Comparative Example 11

The hollow particles of Comparative Example 1 were produced in the same manner as Production Example 1 described in JP-A No. 2000-313818.

In particular, 70 parts of styrene, 27 parts of butadiene, 3 parts of itaconic acid and 12 parts of t-dodecyl mercaptan were added to an aqueous solution obtained by dissolving 0.5 parts of reactive emulsifier SE10N (product name, manufactured by ADEKA Corporation) and 1.0 part of ammonium persulfate in 200 parts of distilled water. While stirring the aqueous solution, the aqueous solution was subjected to a polymerization reaction at 75° C. for 8 hours, thereby obtaining polymer particles. Next, using the polymer particles as a seed polymer, the following polymerization was carried out. That is, 10 parts of the polymer particles, 0.5 parts of ammonium persulfate and, as surfactants, 0.1 parts of polyoxyethylene nonylphenyl ether and 0.4 parts of ammonium lauryl sulfate, were dispersed in 900 parts of distilled water. Next, a mixture of 50 parts of methyl methacrylate, 40 parts of divinylbenzene, 10 parts of α-methylstyrene and 20 parts of toluene was added thereto, and the thus-obtained mixed solution was subjected to a polymerization reaction at 75° C. for 5 hours. As a result, a dispersion of precursor particles was obtained, which contained toluene in their interior. The obtained precursor particles were spray-dried, thereby obtaining the hollow particles of Comparative Example 1.

Comparative Example 21

The hollow particles of Comparative Example 2 were produced in the same manner as Comparative Example 1, except that the amount of the polyoxyethylene nonylphenyl ether was changed from 0.1 parts to 0.3 parts, and 0.4 parts of sodium lauryl sulfate was used instead of 0.4 parts of the ammonium lauryl sulfate.

[Evaluation]

The hollow particles obtained in Examples 1 to 3 and Comparative Examples 1 and 2 were measured and evaluated as follows. The results are shown in Table 1.

1. Volume Average Particle Diameter

The volume average particle diameter of the hollow particles was measured with a particle size distribution measuring device (product name: MULTISIZER 4e, manufactured by: Beckman Coulter, Inc.) The measurement condition is as follows.

Aperture diameter: 50 μm
Dispersion medium: ISOTON II (product name)
Concentration: 10%
Number of the measured hollow particles: 100,000 particles More specifically, 0.2 g of the sample hollow particles were put in a beaker. As a dispersant, a surfactant aqueous solution (product name: DRIWEL, manufactured by: Fujifilm Corporation) was added thereto. In addition, 2 mL of the dispersion medium was added to wet the hollow particles. Then, 10 mL of the dispersion medium was added thereto. The mixture was dispersed for one minute with an ultrasonic disperser. Then, the measurement with the above-described particle size measuring device was carried out.

2. Void Ratio 2-1. Measurement of Apparent Density of Hollow Particles

First, approximately 30 cm$^3$ of the hollow particles were introduced into a measuring flask with a volume of 100 cm$^3$, and the mass of the introduced hollow particles was precisely weighed. Next, the measuring flask in which the hollow particles were introduced, was precisely filled with isopropanol up to the marked line while care was taken so that air bubbles did not get in. The mass of the isopropanol added to the measuring flask was precisely weighed, and the apparent density $D_1$ (g/cm$^3$) of the hollow particles was calculated by the following formula (I).

$$\text{Apparent density } D_1 = [\text{Mass of the hollow particles}]/(100-[\text{Mass of the isopropanol}]/[\text{Specific gravity of the isopropanol at the measuring temperature}]) \quad \text{Formula (I)}$$

2-2. Measurement of True Density of Hollow Particles

The hollow particles were pulverized in advance; approximately 10 g of the pulverized hollow particles were introduced into a measuring flask with a volume of 100 cm$^3$; and the mass of the introduced pulverized particles was precisely weighed.

Then, similarly to the measurement of the apparent density mentioned above, isopropanol was added to the measuring flask; the mass of the isopropanol was precisely weighed; and the true density $D_0$ (g/cm$^3$) of the hollow particles was calculated by the following formula (II).

$$\text{True density } D_0 = [\text{Mass of the pulverized hollow particles}]/(100-[\text{Mass of the isopropanol}]/[\text{Specific gravity of the isopropanol at the measuring temperature}]) \quad \text{Formula (II)}$$

2-3. Calculation of void ratio

The void ratio of the hollow particles was calculated by the following formula (III) where $D_1$ is the apparent density of the hollow particles and $D_0$ is the true density thereof.

$$\text{Void ratio (\%)} = 100 - (\text{Apparent density } D_1/\text{True density } D_0) \times 100 \quad \text{Formula (III)}$$

3. Measurement of Relative Permittivity

Using a perturbation-type measuring device (manufactured by: AET Inc., model: ADMS01Nc), the relative permittivity of the hollow particles was measured at a frequency of 1 MHz and at room temperature (25° C.).

4. Content of Surfactant on Particle Surface

First, 50 ml of ultrapure water and 5 g of the hollow particles were accurately weighed and mixed well. The mixture was subjected to ultrasonic irradiation for 30 minutes and then filtered with a 0.45 μm syringe membrane filter. The thus-obtained filtrate was freeze-dried, and the thus-obtained residue was mixed with 1 g of tetramethylsilane (TMS) as a solvent and dissolved. Then, $^1$H-NMR measurement was carried out in the following condition. For the surfactant specified from the $^1$H-NMR spectrum, a calibration curve was prepared based on TMS intensity basis, and the amount of the surfactant extracted from the surface of the hollow particles was calculated. The calibration curve was prepared from the TMS intensity and the peak intensity ratio derived from the surfactant. The ratio of the amount of the surfactant extracted from the surface of the hollow particles with respect to the mass of the hollow particles, was calculated and regarded as the content of the surfactant present on the surface of the hollow particles.

The particles for which the surfactant was not detected from the $^1$H-NMR spectrum, were regarded as "not detected (ND)".

<$^1$H-NMR Measurement Condition>

Device: FT-NMR device

Resonant frequency: 400 MHz

Measurement mode: 1H-NMR

Pulse width: 5.0 μs (Pulse angle: 90°)

Measurement range: 26 ppm (Frequency range: 10500 Hz)

Accumulated number of times: 1024

Measurement temperature: 40° C.

Solvent: Deuterated chloroform (TMS (tetramethylsilane) 1%)

Reference material: Tetramethylsilane-derived peak: 0.00 ppm (Internal standard method)

5. Content of Metal in Particles

Wet digestion of the weighed hollow particles (10 g) was carried out by use of a microwave (MULTIWAVE 3000 manufactured by PerkinElmer Inc.) ICP optical emission spectroscopy of the thus-obtained degradation product was carried out by use of an ICP optical emission spectrometer (OPTIMA 2100 DV manufactured by PerkinElmer Inc.) to measure the total mass of the metal. The metal species was specified by elemental analysis by X-ray fluorescence spectrometry (XRF). The ratio of the total mass of the metal in the degradation product with respect to the mass of the hollow particles, was calculated and regarded as the content of the metal in the hollow particles.

6. Reliability Test Under High-Humidity Environment

<Preparation of Resin Varnish Containing Hollow Particles>

First, 90 parts of brominated epoxy resin (product name: YDB-500EK75, manufactured by: Tohto Kasei Co., Ltd., epoxy equivalent: 500, solid content: 75% by mass) and 10 parts of cresol novolac type epoxy resin (product name: YDCN220EK75, manufactured by: Tohto Kasei Co., Ltd., epoxy equivalent: 210, solid content: 75% by mass) were dissolved in a mixed solvent (room temperature) of 20 parts of dimethylformamide (DMF) and 6 parts of methyl ethyl ketone (MEK). In addition, 2 parts of dicyandiamide (DICY) (manufactured by Nippon Carbide Industries, Co., Inc.) and 0.1 parts of 2-ethyl-4-methylimidazole (2E4MZ) (manufactured by Shikoku Chemicals Corporation) was added thereto, and they were mixed by stirring, thereby preparing a resin varnish.

Next, the resin varnish was cooled to room temperature, and 95 parts of the cooled resin varnish and 5 parts of the hollow particles were mixed by stirring with a dispersion mixer at 3000 rpm for 30 minutes, thereby obtaining the resin varnish containing the hollow particles.

<Production of Prepreg>

A glass cloth (product name: WEA116E, manufactured by: Nitto Boseki Co., Ltd.) was impregnated with the obtained resin varnish containing the hollow particles. Then, the cloth was dried by heating at a temperature of from 150° C. to 170° C. for 3 minutes to 10 minutes, thereby obtaining a prepreg.

<Production of Double-Sided Copper Clad Laminate>

A copper foil (ST foil) having a thickness of 35 μm was disposed on both sides of the obtained prepreg. They were heated and pressed in the following curing condition, thereby obtaining a double-sided copper clad laminate having a thickness of 0.13 Hmm.
  Temperature: 180° C.
  Heating and pressing time: 2 hours
  Pressure: 2.94 MPa (30 kg/cm$^2$)
<Reliability Test>
Pressure cooker treatment (110° C., humidity 85% RH, 100 hours) of the thus-obtained, double-sided copper clad laminate was performed. After the treatment, a voltage of 50 V was applied to the double-sided copper clad laminate for a predetermined time; the resistance of the laminate was measured; and the presence or absence of an abnormality was checked and evaluated in accordance with the following evaluation criterion. In the case where a change occurred in the resistance, it was regarded as "abnormal". The change in the resistance is considered to be due to the corrosion of the copper substrate of the laminate.
(Reliability Test Evaluation Criteria)
  ⊚: No abnormality occurred even after the voltage was applied for 300 hours.
  o: No abnormality occurred even after the voltage was applied for 100 hours.
  x: An abnormality occurred before the voltage applying time reached 100 hours.

Accordingly, in the reliability test, the hollow particles obtained in Comparative Examples 1 and 2 caused an abnormality before the voltage applying time reached 100 hours, which indicated poor performance stability of the hollow particles in a high-humidity environment, and the relative permittivity of the hollow particles was more than 1.6 and high. The surfactants detected from the surface of the hollow particles obtained in Comparative Example 1 were polyoxyethylene nonylphenyl ether (solubility in water at 25° C.: 1 g/L or more) and ammonium lauryl sulfate (solubility in water at 25° C.: 100 g/L). The surfactants detected from the surfaces of the hollow particles obtained in Comparative Example 2 were polyoxyethylene nonylphenyl ether (solubility in water at 25° C.: 1 g/L or more) and sodium lauryl sulfate (solubility in water at 25° C.: 100 g/L).

Meanwhile, the hollow particles obtained in Examples 1 to 3 were hollow particles such that the polymer contained in the shell was the polymer in which from 70 parts by mass to 100 parts by mass of the crosslinkable monomer unit was contained in 100 parts by mass of all monomer units; the void ratio was 60% or more; and the content of the surfactant present on the surface of the hollow particles was 200 ppm or less. Accordingly, even after the voltage was applied for 300 hours in the reliability test, the hollow particles caused

TABLE 1

| | | Example 1 | Example 2 | Example 3 | Comparative Example 1 | Comparative Example 2 |
|---|---|---|---|---|---|---|
| Polymerizable monomer (Parts) | EGDMA | 31.9 | 18.3 | 31.9 | — | — |
| | TMPT | 13.7 | 7.9 | 13.7 | — | — |
| | MA | 2.3 | 2.3 | 2.3 | — | — |
| | MMA | — | — | — | 50 | 50 |
| | DVB | — | — | — | 40 | 40 |
| | α-MSt | — | — | — | 10 | 10 |
| Polar resin A (Parts) | | 0.2 | 0.2 | 0.2 | — | — |
| V-65 (Parts) | | 1.04 | 1.04 | 1.04 | — | — |
| Cyclohexane (Parts) | | 54.5 | 69.7 | 54.5 | — | — |
| Dispersion stabilizer | | Mg(OH)$_2$ | Mg(OH)$_2$ | Mg(OH)$_2$ | Surfactant | Surfactant |
| Volume average particle diameter (μm) | | 8.3 | 5.3 | 3.3 | 0.44 | 0.42 |
| Void ratio (%) | | 65 | 80 | 65 | 55 | 55 |
| Relative permittivity | | 1.5 | 1.3 | 1.5 | 1.7 | 1.7 |
| Surfactant content (ppm) | | ND | ND | ND | 250 | 400 |
| Metal content (ppm) | | 37 | 43 | 66 | 6 | 342 |
| Reliability test | | ⊚ | ⊚ | ⊚ | X | X |

The meanings of abbreviations shown in Table 1 are as follows.
  EGDMA: Ethylene glycol dimethacrylate
  TMPT: Trimethylolpropane triacrylate
  MA: Methyl acrylate
  MMA: Methyl methacrylate
  DVB: Divinylbenzene
  α-MSt: α-Methylstyrene
  V-65: 2,2'-Azobis(2,4-dimethylvaleronitrile) (an oil-soluble polymerization initiator manufactured by FUJIFILM Wako Pure Chemical Corporation, product name: V-65)

Consideration

The hollow particles obtained in Comparative Examples 1 and 2 were hollow particles such that the ratio of the crosslinkable monomer unit with respect to 100 parts by mass of all monomer units of the polymer contained in the shell, was less than 70 parts by mass; the void ratio was less than 60%; and the content of the surfactant present on the surface of the hollow particles was more than 200 ppm.

no abnormality, which indicated excellent performance stability of the hollow particles in a high-humidity environment; moreover, the relative permittivities of the hollow particles were 1.6 or less, which indicated that they were particles having a low relative permittivity. No surfactants were detected from the surface of the hollow particles obtained in Examples 1 to 3.

REFERENCE SIGNS LIST

1. Aqueous medium
2. Low polarity material
4. Monomer composition
4a. Hydrophobic solvent
4b. Material not containing hydrophobic solvent
4c. Polymerizable monomer dispersed in aqueous medium
5. Oil-soluble polymerization initiator
6. Shell
8. Hollow portion
10. Droplet
20. Precursor particle 100. Hollow particle having a hollow portion filled with gas

The invention claimed is:

1. Hollow particles which comprise a shell containing a resin and a hollow portion surrounded by the shell,
   wherein the shell contains, as the resin, a polymer in which from 70 parts by mass to 100 parts by mass of a crosslinkable monomer unit is contained in 100 parts by mass of all monomer units;
   wherein the crosslinkable monomer unit contains a monomer unit derived from a bifunctional crosslinkable monomer and a monomer unit derived from a trifunctional or higher-functional crosslinkable monomer;
   wherein a content of the monomer unit derived from the bifunctional crosslinkable monomer is 50 parts by mass or more and 90 parts by mass or less, and a content of the monomer unit derived from the trifunctional or higher-functional crosslinkable monomer is 5 parts by mass or more and 40 parts by mass or less, in 100 parts by mass of all monomer units of the polymer;
   wherein a void ratio is 60% or more;
   wherein a content of a surfactant present on a surface of the hollow particles is 200 ppm or less;
   wherein a content of a metal measured by ICP optical emission spectroscopy is 1 ppm or more and 100 ppm or less; and wherein a volume average particle diameter of the hollow particles is from 1 μm to 10 μm
   wherein a relative permittivity at a frequency of 1 MHz is 1.6 or less.

2. The hollow particles according to claim 1, wherein the void ratio is 60% or more and 90% or less.

3. The hollow particles according to claim 1, wherein the content of the crosslinkable monomer unit is 90 parts by mass or more and 97 parts by mass or less in 100 parts by mass of all monomer units of the polymer.

4. The hollow particles according to claim 1, wherein the bifunctional crosslinkable monomer is at least one selected from the group consisting of divinylbenzene, ethylene glycol di(meth)acrylate, and pentaerythritol di(meth)acrylate.

5. The hollow particles according to claim 1, wherein the trifunctional or higher-functional crosslinkable monomer is at least one selected from the group consisting of pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate, and dipentaerythritol poly(meth)acrylate.

6. The hollow particles according to claim 1, wherein the hollow particles are obtained by a suspension polymerization method using an inorganic dispersion stabilizer and a metal-free oil-soluble polymerization initiator.

7. The hollow particles according to claim 1,
   wherein the content of the crosslinkable monomer unit is 90 parts by mass or more and 97 parts by mass or less in 100 parts by mass of all monomer units of the polymer, and
   wherein a volume average particle diameter of the hollow particles is from 1 μm to 10 μm.

8. The hollow particles according to claim 7,
   wherein the bifunctional crosslinkable monomer is at least one selected from the group consisting of divinylbenzene, ethylene glycol di(meth)acrylate, and pentaerythritol di(meth)acrylate, and
   wherein the trifunctional or higher-functional crosslinkable monomer is at least one selected from the group consisting of pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate, and dipentaerythritol poly(meth)acrylate.

9. The hollow particles according to claim 8, wherein the hollow particles are obtained by a suspension polymerization method using an inorganic dispersion stabilizer and a metal-free oil-soluble polymerization initiator.

* * * * *